(12) United States Patent
Shile et al.

(10) Patent No.: US 8,261,662 B1
(45) Date of Patent: Sep. 11, 2012

(54) ACTIVE PEN NANOLITHOGRAPHY

(75) Inventors: Raymond Roger Shile, Los Gatos, CA (US); Terrisa Duenas, Ventura, CA (US); John Edward Bussan, Naperville, IL (US); Gregory J. Athas, Lisle, IL (US); Joseph S. Fragala, San Jose, CA (US); Jason R. Haaheim, Chicago, IL (US); Sylvain Cruchon-Dupeyrat, Chicago, IL (US); Jeffrey R. Rendlen, Glen Ellyn, IL (US)

(73) Assignee: NanoInk, Inc., Skokie, IL (US)

( * ) Notice: Subject to any disclaimer, the term of this patent is extended or adjusted under 35 U.S.C. 154(b) by 1435 days.

(21) Appl. No.: 11/268,740

(22) Filed: Nov. 8, 2005

Related U.S. Application Data

(60) Provisional application No. 60/625,585, filed on Nov. 8, 2004.

(51) Int. Cl.
*H01L 21/02* (2006.01)
(52) U.S. Cl. .................................. 101/327; 977/851
(58) Field of Classification Search ............... None
See application file for complete search history.

(56) References Cited

U.S. PATENT DOCUMENTS

| | | | |
|---|---|---|---|
| 4,747,698 A | 5/1988 | Wickramasinghe et al. |
| 4,916,002 A | 4/1990 | Carver |
| 5,047,637 A | 9/1991 | Toda |
| 5,116,462 A | 5/1992 | Bartha et al. |
| 5,221,415 A | 6/1993 | Albrecht et al. |
| 5,356,218 A | 10/1994 | Hopson et al. |
| 5,388,323 A | 2/1995 | Hopson et al. |
| 5,399,232 A | 3/1995 | Albrecht et al. |
| 5,475,318 A | 12/1995 | Marcus et al. |
| 5,580,827 A | 12/1996 | Akamine |
| 5,835,477 A | 11/1998 | Binnig et al. |
| 5,929,438 A | 7/1999 | Suzuki et al. |
| 6,265,718 B1 * | 7/2001 | Park et al. ................. 850/10 |
| 6,635,311 B1 | 10/2003 | Mirkin et al. |
| 6,642,129 B2 | 11/2003 | Liu et al. |
| 6,674,074 B2 | 1/2004 | Schwartz |

(Continued)

FOREIGN PATENT DOCUMENTS

WO WO 00/41213 A1 7/2000

(Continued)

OTHER PUBLICATIONS

Bilenberg et al., "PMMA to SU-8 bonding for polymer based lab-on-a-chip systems with integrated optics," J. Micromech. Microeng., 2004, vol. 14, pp. 814-818.

(Continued)

*Primary Examiner* — Joshua D Zimmerman
(74) *Attorney, Agent, or Firm* — Foley & Lardner LLP

(57) ABSTRACT

Improved actuated probes suitable for scanning probe lithography or microscopy, and especially direct-write nanolithography and method of fabrication thereof. In one embodiment, thermomechanically actuated cantilevers with oxide-sharpened microcast tips are inexpensively fabricated by a process that comprises low-temperature wafer bonding, such as (gold) thermocompressive bonding, eutectic or adhesive bonding. Also provided is a flexcircuit that electrically interconnects the actuated probes to external circuitry and mechanically couples them to the instrument actuator. An improved scanning probe lithography instrument, hardware and software, can be built around the actuated cantilevers and the flexcircuit. Finally, provided is an improved microfluidic circuit to deliver chemical compounds to the tips of (actuated) probes and a fabrication method for tall, high-aspect-ratio tips.

11 Claims, 22 Drawing Sheets

U.S. PATENT DOCUMENTS

| | | |
|---|---|---|
| 6,737,646 B2 | 5/2004 | Schwartz |
| 6,827,979 B2 | 12/2004 | Mirkin et al. |
| 2002/0122873 A1 | 9/2002 | Mirkin et al. |
| 2003/0068446 A1 | 4/2003 | Mirkin et al. |
| 2003/0162004 A1 | 8/2003 | Mirkin et al. |
| 2003/0185967 A1 | 10/2003 | Eby et al. |
| 2004/0026681 A1 | 2/2004 | Cruchon-Dupeyrat et al. |
| 2004/0028814 A1 | 2/2004 | Mirkin et al. |
| 2004/0037959 A1 | 2/2004 | Mirkin et al. |
| 2004/0101469 A1 | 5/2004 | Demers |
| 2004/0127025 A1 | 7/2004 | Crocker, Jr. et al. |
| 2004/0175631 A1 | 9/2004 | Crocker et al. |
| 2005/0009206 A1 | 1/2005 | Mirkin et al. |
| 2005/0035983 A1 | 2/2005 | Cruchon-Dupeyrat et al. |
| 2005/0172704 A1 | 8/2005 | Mirkin et al. |
| 2005/0181132 A1 | 8/2005 | Mirkin et al. |
| 2005/0191434 A1 | 9/2005 | Mirkin et al. |
| 2005/0235869 A1 | 10/2005 | Cruchon-Dupeyrat et al. |
| 2005/0255237 A1 | 11/2005 | Zhang et al. |
| 2005/0272885 A1 | 12/2005 | Mirkin et al. |
| 2006/0014001 A1 | 1/2006 | Zhang et al. |
| 2006/0049381 A1 | 3/2006 | Klein et al. |

FOREIGN PATENT DOCUMENTS

| | | |
|---|---|---|
| WO | WO 01/91855 A1 | 12/2001 |
| WO | WO 2004/044552 A2 | 5/2004 |

OTHER PUBLICATIONS

Blackstock et al., "Template stripping using cold welding," J. Vac. Sci. Technol. A, May/Jun. 2004, vol. 22, No. 3, pp. 602-605.

Brooks et al., "Low-Temperature Electrostatic Silicon-to-Silicon Seals Using Sputtered Borosilicate Glass," J. Electrochem. Soc., Solid-State Science and Technology, Apr. 1972, vol. 119, No. 4, pp. 545-546.

Bullen et al., "Development of Parallel Dip Pen Nanolithography Probe Arrays for High Throughput Nanolithography," Mat. Res. Soc. Symp. Proc., 2003, vol. 758, pp. 141-150.

Chahoud, M., "Etching simulation of negative sloped planes at convex mask corners in Si," Sensors and Actuators !, 2005, vol. 117, pp. 356-363.

Choi et al., "Effects of temperatures on microstructures and bonding strengths of Si-Si bonding using bisbenzocyclobutene," Sensors and Actuators A, 2003, vol. 108, pp. 201-205.

Chu et al., "A Novel Convex Corner Compensation for Wet Anisotropic Etching on (100) Silicon Wafer," 17$^{th}$ IEEE International Conference on Micro Electro Mechanical Systems, Maastricht MEMS 2004 Technical Digest, Jan. 25-29, 2004, pp. 253-256.

Enoksson, Peter, "New structure for corner compensation in anisotropic KOH etching," J. Micromech. Microeng., 1997, vol. 7, pp. 141-144.

Journal of Vacuum Science & Technology A, Second Series, vol. 8, No. 4, Jul./Aug. 1990, Table of Contents, 7 pages.

Li et al., "Fabrication of micronozzles using low-temperature wafer-level bonding with SU-8," J. Micromech. Microeng., 2003, vol. 13, pp. 732-738.

Pan et al., "A low-temperature wafer bonding technique using patternable materials," J. Micromech. Microeng., 2002, vol. 12, pp. 611-615.

Quenzer et al., "Anodic-bonding on glass layers prepared by a spin-on glass process: preparation process and experimental results," Transducers '01, Eurosensors XV, The 11$^{th}$ International Conference on Solid-State Sensors and Actuators, Munich, Germany, Jun. 10-14, 2001, pp. 230-233.

Schmidt, Martin A., "Wafer-to-Wafer Bonding for Microstructure Formation," Proceedings of the IEEE, Aug. 1998, vol. 86, No. 8, pp. 1575-1585.

Sheehan et al., "Nanoscale deposition of solid inks via thermal dip pen nanolithography," Applied Physics Letters, Aug. 30, 2004, vol. 85, No. 9, pp. 1589-1591.

Tsau et al., "Characterization of low temperature, wafer-level gold-gold thermocompression bonds," Mat. Res. Soc. Symp. Proc., 2000, vol. 605, pp. 171-176.

Tsau et al., "Fabrication of Wafer-Level Thermocompression Bonds," Journal of Microelectromechanical Systems, Dec. 2002, vol. 11, No. 6, pp. 641-647.

Vu et al., "Patterned eutectic bonding with Al/Ge thin films for microelectromechanical systems," J. Vac. Sci. Technol. B, Jul./Aug. 1996, vol. 14, No. 4, pp. 2588-2594.

Yang et al., "Effects of various ion-typed surfactants on silicon anisotropic etching properties in KOH and TMAH solutions," Sensors and Actuators A, 2005, vol. 119, pp. 271-281.

Wang et al., "Thermally actuated probe array for parallel dip-pen nanolithography," J. Vac.Sci. Technol. B, Nov./Dec. 2004, vol. 22, No. 6, pp. 2563-2567.

Zhang et al., "A MEMS nanoplotter with high-density parallel dip-pen nanolithography probe arrays," Nanotechnology, 2002, vol. 13, pp. 212-217.

* cited by examiner

Figure 17a: Active Pen Inkwell Layout
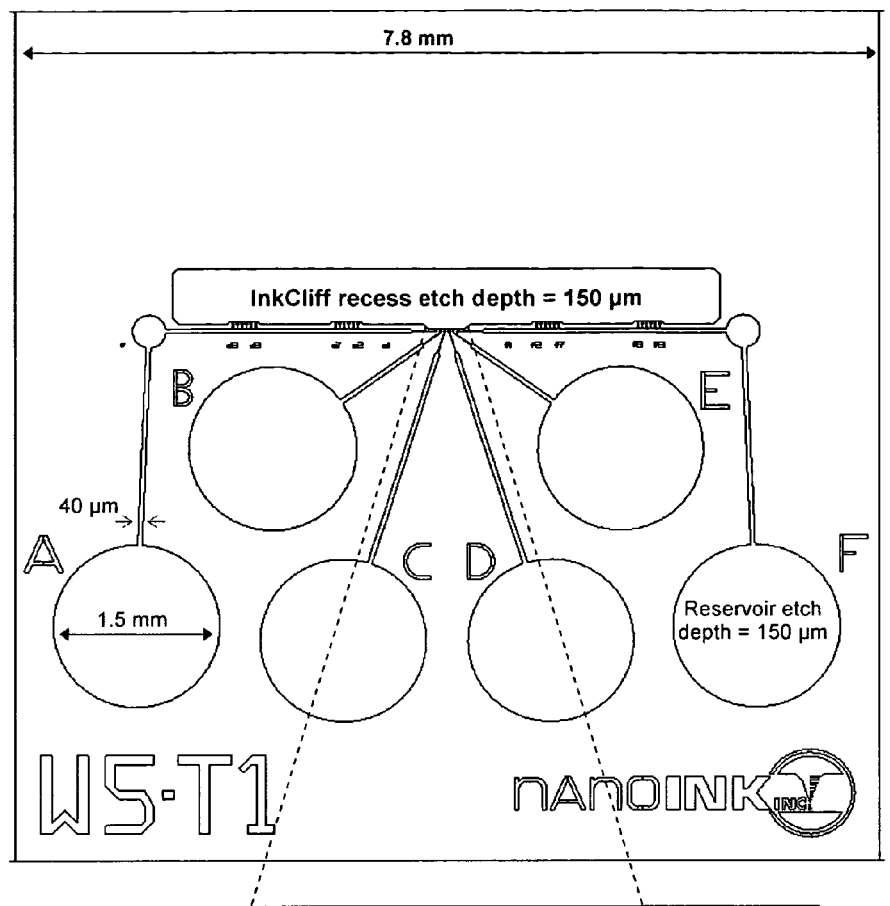
Figure 17b: Zoom of Central Microwell Array
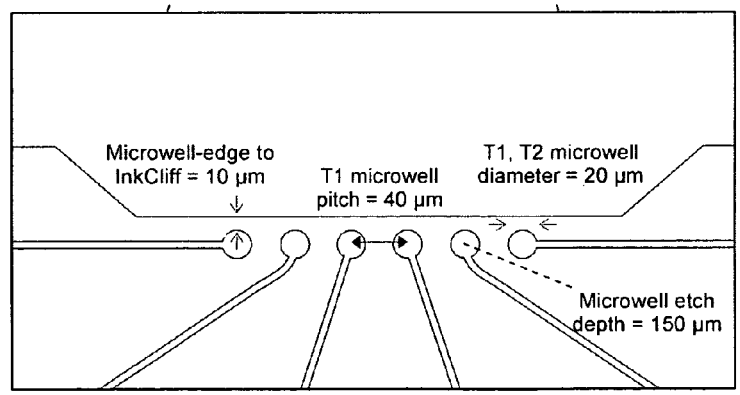

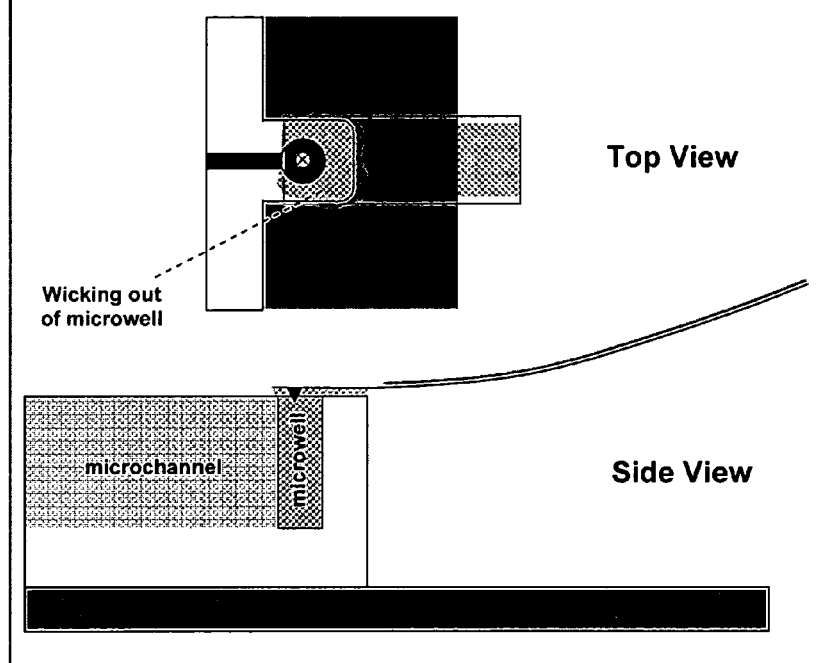

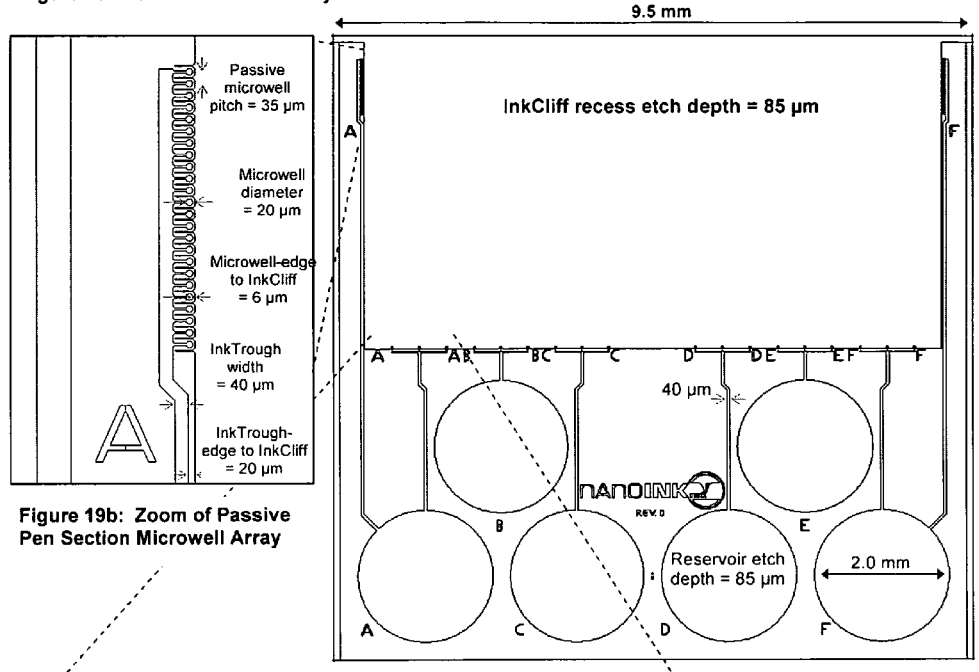
Figure 19a: Universal Inkwell Layout
Figure 19b: Zoom of Passive Pen Section Microwell Array
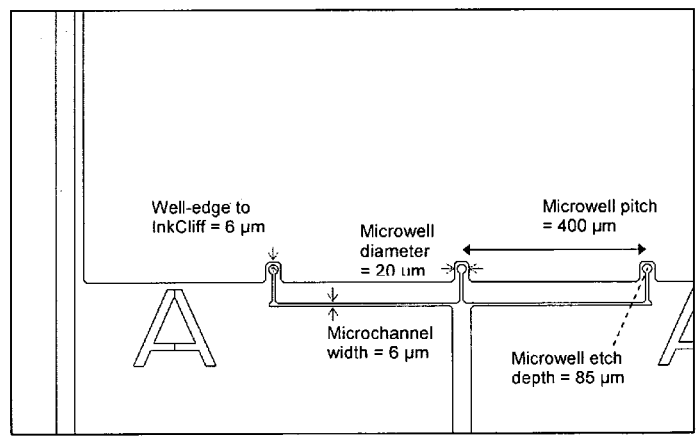
Figure 19c: Zoom of Active Pen Section Microwell Array

ACTIVE PEN NANOLITHOGRAPHY

CROSS-REFERENCE TO RELATED PATENT APPLICATIONS

This application claims priority to provisional patent application Ser. No. 60/625,585 filed Nov. 8, 2004 to Fragala et al., which is hereby incorporated by reference in its entirety.

BACKGROUND

This application generally relates to direct-write nanolithography instruments and cantilevered microactuators for use in, for example, direct-write printing methods and scanning probe lithography techniques, and methods of fabrication and use thereof.

U.S. Pat. No. 6,635,311 to Mirkin et al. ("Methods Utilizing Scanning Probe Microscope Tips And Products Therefor Or Produced Thereby") discloses a direct-write patterning method in which, for example, a sharp tip ("pen") coated with a chemical compound or mixture ("ink") is contacted with a substrate, where it deposits said compound or mixture by capillary action. Arbitrary patterns may be fabricated with nanometer-scale resolution, and a wide variety of inks, including but not limited to biomolecules, metal or ceramic precursors, nanoparticles, and small organic molecules, can be used. Commercial applications are numerous. These include but are not limited to nanoencryption, the repair of photomasks used for semiconductor chip manufacturing, the repair of flat panel displays, such as computer and TV screens, and the fabrication of high-density biomolecule microarrays and nanoarrays.

The direct-write printing can be performed with an Atomic Force Microscope, which comprises a single microfabricated cantilever (usually a beam projecting from a handle substrate) with an integrated tip. In many cases, a laser beam is reflected on the back of the cantilever towards a quadrant photodiode to monitor its deflection, hence the force between its tip and sample. A feedback loop can be used to keep the cantilever deflection constant to track the sample topography during patterning.

Like e-beam lithography, the printing can be a serial pattern generation technique. It is thus commercially advantageous to operate multiple pens in parallel to increase the patterning throughput. These pens may be moved in concert by a macroscopic actuator (forming a "passive array") or they may be individually actuated at least in one direction.

Passive pen arrays, which are commercially available from NanoInk, Inc. (Chicago, Ill.), can only produce a fixed number of copies of identical patterns. In contrast, individually actuated pens (also called "active pens") may produce arbitrary patterns. In addition, individually actuated pens also provide: (a) the ability to write a pattern with a coated tip, then to image it with a clean tip, thus eliminating the sample contamination that would occur otherwise; (b) the ability to write with multiple inks in one writing session without the need to change probes; this permits the fabrication of multi-component nanopatterns; (c) an easier delivery of an ink to an individual probe, e.g. by dipping one probe at the time into microfluidic reservoirs (e.g., "inkwells"); and (d) the use of multiple tips coated with the same ink one after the next without need to recoat the tip, once ink is exhausted (the active pen array acting like an "Ink bandolier").

U.S. Pat. No. 5,475,318 to Marcus et al. discloses a microfabricated, bimorph-actuated cantilever having a silicon tip and a resistive heater, which is intended for wafer probe cards. The method of preparation is very complex, thus prone to low yields and expensive. The articles do not address direct-write printing.

U.S. Pat. No. 6,642,129 to Liu et al. discloses individually actuated, thermomechanical or electrostatic probes for direct write printing from cantilevers and tips and a method of fabrication thereof. The patent describes preparing silicon nitride ($SiN_x$) cantilevers and tips with a relatively simple process. $SiN_x$ cantilevers are preferred because of their higher resilience to brittle rupture than silicon ones. However, this process produces dull tips because it prepares convex tip molds (i.e., with their sharp end pointing away from the wafer substrate) and coats them with a (silicon nitride) film of finite thickness. Sharp tips are generally preferred, as higher resolution is achievable when patterning and imaging. The patent does not address some important issues with active pens. See, also, Zhang et al., *Nanotechnology*, 13, pp. 212-217, 2002; Bullen et al., *Mat. Res. Soc. Proc.*, 758, pp. LL4.2.1-LL4.2.10, 2002.

U.S. Pat. No. 4,916,002 to Carver et al. at Stanford University ("Microcasting of microminiature tips") discloses a method that uses anisotropically etched pits in silicon as a mold for tips. In this method, the tip is formed through and interlocked with an aperture in a cantilever. The tip fabrication step is distinct from the cantilever patterning; this process is meant to fabricate tips made of a different material than the cantilever.

U.S. Pat. No. 5,116,462 to Bartha et al., IBM, which is entitled "Method of producing micromechanical sensors for AFM/STM profilometry", and U.S. Pat. Nos. 5,221,415 and 5,399,232 to Albrecht et al. (Stanford University) disclose a method of producing non-actuating cantilevers with integrated tips by (a) etching recesses in a (silicon) substrate through a (silicon dioxide) mask; anisotropic etching starting with square patterns results in inverted pyramids; (b) depositing a dielectric layer of e.g. silicon nitride using the recesses as tip molds; (c) patterning the dielectric layer and (d) releasing the cantilever so formed by etching the substrate away.

Further reduction of the tip apex radius may be achieved with the help of U.S. Pat. No. 5,580,827 to Akamine et al. (Stanford). '827 discloses a method of "casting sharpened microminiature tips" by submitting an etch pit in a silicon substrate to oxidation at a low temperature. Oxidation in these conditions is hindered at corner surfaces and thus forms a thinner layer near the bottom of the pit than on its sidewalls, leading to a sharpened tip after microcasting. Thus, it is another aspect to improve on Akamine's methods to fabricate active cantilevers with oxide-sharpened microcast tips.

Thus, a need exists to improve upon such methods to inexpensively fabricate actuated, including thermomechanically actuated, cantilevers with sharp tips and for the fabrication of passive (non-actuated) silicon nitride probes with integrated tips.

The use of concave etch mold comes at the expense of an additional wafer bonding step. Indeed, the handle substrate and the tip are preferentially placed on opposite faces of the cantilevered member to ensure that the tip, not the handle, contacts the sample first during lithography and imaging. However, the anodic bonding process that is disclosed in the aforementioned Albrecht and Bartha patents occurs at too high a temperature: annealing-induced stress in the metallic-thin-film bimorph element would result in uncontrolled cantilever curvature. Therefore, a need also exists to provide a method of fabrication for actuated cantilevers that does not require high-temperature processing of the wafer after metal deposition. In particular, it is an aspect to provide a method of fabrication of actuated cantilevers that utilizes low-temperature wafer bonding, and especially thermocompressive, eutectic or adhesive wafer bonding. Thermocompressive or eutectic wafer bonding may provide simultaneous electrical and mechanical connections.

A need also exists to provide a system that reversibly and reliably electrically connects a set of actuated cantilevers to their control electronics and mechanically tie them to a high-resolution actuator. It is commercially desirable to provide an actuated probe cartridge or flexible circuit ("flexcircuit") that can be easily installed or replaced by the end user during operation.

It is yet another aspect to provide an instrument that comprises appropriate electronics and software to control the motion of actuated cantilever synchronously to the motion of a high-resolution actuator and permit their calibration and individual, manual or automated control for the purpose of nanolithography.

International PCT application WO 2004/044552 to Cruchon-Dupeyrat et al. (NanoInk) and WO 04/0022681 to Hantschel et al. (Palo Alto Research Center) entitled "Capillary-channel probes for liquid pickup, transportation and dispense using stressy metals" discloses methods and apparatuses to deliver multiple inks to cantilevers. A need exists to improve over current methods and apparatus to selectively deliver ink(s) to actuated cantilevers.

No admission is made that any of these references cited in the Background are indeed prior art.

SUMMARY

One embodiment provides a direct-write nanolithographic printer comprising: (a) a chip comprising a cantilever array which is adapted for individual electronic control of cantilever actuation; (b) a lithography apparatus which is adapted for electrically and mechanically controlling the chip for direct-write printing by delivery of ink from the cantilever array to a surface; and (c) a cartridge which is adapted for electrically and mechanically coupling the chip to the lithography apparatus and to be removed from the lithography apparatus.

Another embodiment is a nanolithography instrument comprising:
(A) an actuated cantilever chip for direct-write nanolithographic printing with a delivery of a patterning compound from a tip to a surface comprising: a handle substrate comprising a top surface, a bottom surface, and side edges including a first side edge; at least one actuated cantilever array disposed on and extending from the handle substrate at a first side edge of the handle substrate; contact pads disposed on the handle substrate at a second edge of the handle substrate; conductive traces connecting the contact pads with the actuated cantilever array; and
(B) a flexcircuit comprising: (a) the actuated cantilever chip supported by a first stiffener, (b) a second stiffener comprising at least one high-density electrical connector, and (c) a flexible ribbon electrically connecting but mechanically decoupling the first and second stiffeners.

Another embodiment comprises a cartridge for use in a direct-write nanolithographic printer comprising: a cartridge for electrically and mechanically coupling a chip to a direct-write lithography apparatus, wherein the chip comprising a cantilever array which is adapted for individual electronic control of cantilever actuation; and wherein the lithography apparatus is adapted for electrically and mechanically controlling the chip for direct-write printing by delivery of ink from the cantilever array to a surface; and wherein the cartridge is adapted to be removed from the lithography apparatus.

Another embodiment is a method for fabrication of probes for direct-write nanolithographic printing with a delivery of a patterning compound from a tip to a substrate comprising the steps of: anisotropically etching a patterned probe wafer to form a tip mold; oxidation sharpening of the tip mold; deposition patterning of silicon-rich silicon nitride by low pressure chemical vapor deposition to form cantilevers and tips; depositing and patterning of layers of metal to define heaters, heat spreaders, and wiring; thermocompressive bonding of said probe wafer to a handle wafer which comprises contact pads; and release of the cantilevers.

Another embodiment is a method for fabricating actuated probes for scanning probe lithography comprising the steps of: providing a probe wafer, fabricating a probe member on said probe wafer, providing a handle wafer, bonding said probe wafer to handle wafer at a temperature inferior to 300 degrees Celsius, and removing parts or whole of said probe wafer, except said probe member.

BRIEF DESCRIPTION OF THE FIGURES

FIG. 17 illustrates an Active Pen Inkwell design in which the "A" and "F" microchannels pass through a single smaller reservoir placed along its length. These smaller reservoirs act as bubble traps to ensure smooth ink flow, and also provide additional ink storage. FIG. 17a shows an active pen inkwell layout. FIG. 17b shows a zoom of a central microwell array.

FIG. 18 shows an active pen dipping process using InkCliff.

FIG. 19 shows (19a) a universal inkwell layout; (19b) zoom of passive pen section microwell array; (19c) zoom of active pen section microwell array.

DETAILED DESCRIPTION

Introduction

Figure 1:
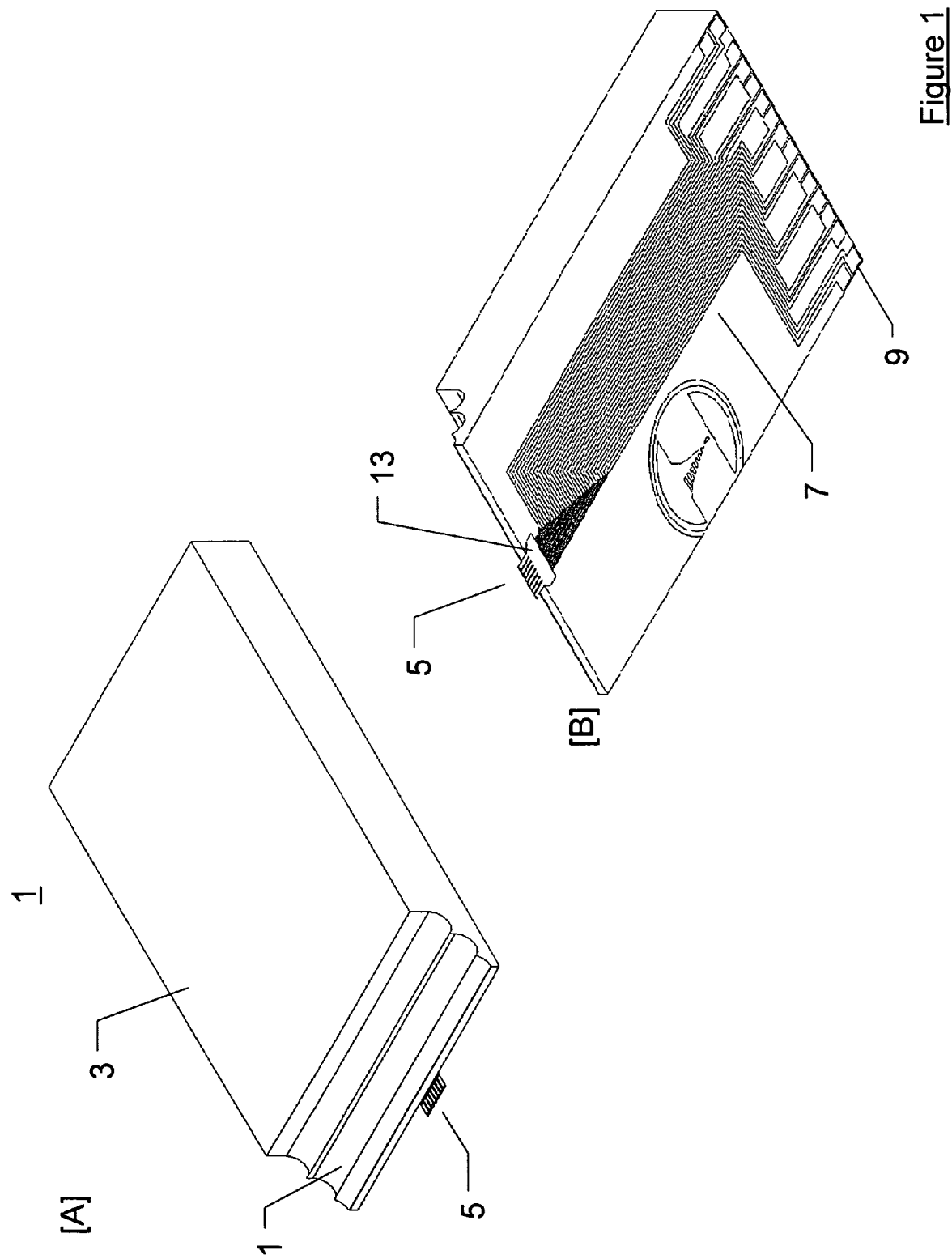
FIG. 1 is a schematic diagram of an actuated cantilever chip.

References will be made in detail to the preferred embodiments, examples of which are illustrated in the accompanying drawings. While the many facets of the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Nanolithography instruments and accessories for direct-write printing can be obtained from NanoInk, Inc., Chicago, Ill. Dip Pen Nanolithography™ and DPN™ are NanoInk, Inc. trademarks.

The paper "Active Probes and Microfluidic Ink Delivery for Dip Pen Nanolithography™" by Rosner et al., BioMEMS and Nanotechnology, edited by Dan V. Niccolau, Uwe R. Muller, John M. Dell, Proceedings of SPIE Vol. 5275 (SPIE, Bellingham, Wash., 2004), 213-222 is hereby incorporated by reference in its entirety. This paper describes microfluidic ink delivery and active probe technology. This paper also refers to 26 references on pages 221 and 222 which can be used including references 22-24 for technology from the C. Liu group.

The following patents and co-pending applications related to direct-write printing with use of cantilevers, tips, and patterning compounds are hereby incorporated by reference in their entirety:
1. U.S. Provisional application 60/115,133 filed Jan. 7, 1999 ("Dip Pen Nanolithography") to Mirkin et al.
2. U.S. Provisional application 60/157,633 filed Oct. 4, 1999 ("Methods Utilizing Scanning Probe Microscope Tips and Products Therefor or Produced Thereby") to Mirkin et al.
3. U.S. patent application Ser. No. 09/477,997 filed Jan. 5, 2000 ("Methods Utilizing Scanning Probe Microscope Tips and Products Therefor or Produced Thereby") to Mirkin et al.
4. U.S. Provisional application 60/207,713 filed May 26, 2000 ("Methods Utilizing Scanning Probe Microscope Tips and Products Therefor or Produced Thereby") to Mirkin et al.
5. U.S. Provisional application 60/207,711 filed May 26, 2000 ("Methods Utilizing Scanning Probe Microscope Tips and Products Therefor or Produced Thereby") to Mirkin et al.
6. U.S. application Ser. No. 09/866,533 filed May 24, 2001 ("Methods Utilizing Scanning Probe Microscope Tips and Products Therefor or Produced Thereby") to Mirkin et al.
7. U.S. patent publication number 2002/0063212 A1 published May 30, 2002 ("Methods Utilizing Scanning Probe Microscope Tips and Products Therefor or Produced Thereby") to Mirkin et al.
8. U.S. patent publication number 2002/0122873 A1 published Sep. 5, 2002 ("Nanolithography Methods and Products Produced Therefor and Produced Thereby").
9. PCT publication number WO 00/41213 A1 published Jul. 13, 2000 based on PCT application no. PCT/US00/00319 filed Jan. 7, 2000 ("Methods Utilizing Scanning Probe Microscope Tips and Products Therefor or Produced Thereby").
10. PCT publication number WO 01/91855 A1 published Dec. 6, 2001 based on PCT application no. PCT/US01/17067 filed May 25, 2001 ("Methods Utilizing Scanning Probe Microscope Tips and Products Therefor or Produced Thereby").
11. U.S. patent application Ser. No. 10/366,717 to Eby et al., filed Feb. 14, 2003 ("Methods and Apparatus for Aligning Patterns on a Substrate").
12. U.S. patent application Ser. No. 10/375,060 to Dupeyrat et al., filed Feb. 28, 2003 ("Nanolithographic Calibration Methods").
13. U.S. Patent Publication 2003/0068446, published Apr. 10, 2003 to Mirkin et al. ("Protein and Peptide Nanoarrays")
14. U.S. patent application Ser. No. 10/307,515 filed Dec. 2, 2002 to Mirkin et al. ("Direct-Write Nanolithographic Deposition of Nucleic Acids from Nanoscopic Tips").
15. U.S. patent application Ser. No. 10/320,721 filed Dec. 17, 2002 to Mirkin et al. ("Patterning of Solid State Features by Direct-Write Nanolithographic Printing").
16. U.S. Patent Publication 2003/0022470, published Jan. 30, 2003, Liu et al. ("Parallel, Individually Addressable Probes for Nanolithography").
17. U.S. Patent Publication 2003/0007242, published Jan. 9, 2003 to Schwartz ("Enhanced Scanning Probe Microscope and Nanolithographic Methods Using Same").
18. U.S. Patent Publication 2003/0005755, published Jan. 9, 2003 to Schwartz ("Enhanced Scanning Probe Microscope").
19. U.S. patent application Ser. No. 10/637,641 filed Aug. 11, 2003.
20. U.S. patent application Ser. No. 10/444,061 filed May 23, 2003.
21. U.S. patent application Ser. No. 10/647,430 filed Aug. 26, 2003.
22. U.S. patent application Ser. No. 10/689,547 filed Oct. 21, 2003.
23. U.S. patent application Ser. No. 10/705,776 filed Nov. 12, 2003.
24. U.S. patent application Ser. No. 10/788,414 filed Mar. 1, 2004.
25. U.S. patent application Ser. No. 10/893,543 filed Jul. 19, 2004.
26. U.S. patent application Ser. No. 11/056,391 filed Feb. 14, 2005.
27. U.S. patent application Ser. No. 11/065,694 filed Feb. 25, 2005.

The direct-write nanolithography instruments and methods described herein are particularly of interest for use in preparing bioarrays, nanoarrays, and microarrays based on peptides, proteins, nucleic acids, DNA, RNA, viruses, and the like. The instruments and methods can be used in nanoelectronics, nanomaterials discovery, metal inking, and etch resist and whittling, photomask repair, and flat panel display repair. Also, brand protection and nanoencryption can be important applications.

The present invention provides, among other embodiments, (i) actuated microprobes, and especially actuated cantilevers with sharp tips; (ii) methods of fabrication thereof, and in particular methods that use low temperature thermocompressive, eutectic or adhesive wafer bonding; (iii) apparatuses and instruments using said actuated cantilevers, especially for the purpose of patterning substrates using direct-write nanolithography, and (iv) patterns formed therewith. Kits can be also prepared which include the actuated cantilevers.

In one embodiment, provided is a thermomechanically actuated cantilever that comprises a silicon nitride beam, a silicon nitride oxide-sharpened tip, a metallic-thin-film resistive heater and bimorph element, the beam being connected to a silicon or Pyrex handle.

In a first preferred embodiment, a method of fabrication of probes for direct write nanolithographic printing comprises the formation of tip molds by anisotropic etching of a patterned probe silicon wafer; oxidation sharpening of said molds; the deposition of silicon-rich silicon nitride by low pressure chemical vapor deposition and patterning using photolithography and etching to form cantilevers and tips; the sputtering and etching of layers of chromium, platinum and gold (or another metal stack) to define heaters, heat spreaders, and wiring; the thermocompressive bonding of said probe wafer to a Pyrex or silicon handle wafer with e.g. chromium, platinum, gold patterns forming wiring and contact pads; and the release of said cantilevers by etching of the probe wafer.

In a second preferred embodiment, a method of fabrication of probes for direct-write nanolithography comprises the formation of tip molds in a silicon probe wafer by anisotropic etching and oxide sharpening; the formation of silicon nitride cantilevers with integrated tips and vias within the nitride defining contact pad areas; the deposition and patterning of a chromium, platinum and gold layer to form in one step the thermomechanical actuators and the entire associated electrical circuit; the bonding via a (polymeric) adhesive, such as SU-8 resist, or via thin film anodic bonding of the probe wafer to a handle wafer, followed by a release step.

In another preferred embodiment, the invention provides a flexcircuit that electrically connects the chip bearing the actuated probes to the instrument's control electronics. The flexcircuit comprises a flexible printed circuit comprising a flexible kapton film and two stiffeners, a high-density microminiature connector, and thermosonically bonded wires connecting the actuated probe chip to the flexible printed circuit.

In yet another preferred embodiment, the invention provides an instrument that utilizes said actuated probes and said flexcircuit to pattern a sample. The instrument comprises a high-resolution piezoelectric actuator mechanically coupled to a first part of the flexcircuit comprising the actuated probe chip, an intermediate cable-and-PCB (printed board circuit) assembly electrically connecting the flexcircuit to cantilever driver electronics. The cantilever driver card is communicating via (a) serial bus(es) with a control computer.

In other preferred embodiments, the invention provides a microfluidic ink delivery device that comprises deep microreservoirs and microfluidic channels connected to shallow microwells intended for dipping the tip of (actuated) cantilevers. That design prevents wicking of the ink (a) along the cantilever in the cantilever hot area, near the bimorph element and the heater and (b) between adjacent, closely spaced cantilevers. The invention also provides tall, high-aspect-ratio tips that also prevent wicking as well as methods of fabrication thereof.

Part A: Actuated Probes and Instrumentation

Embodiment 1

Actuated Cantilever

A basic structure of a first embodiment of an inventive actuated cantilever chip is illustrated in FIGS. 1A and B, which represents top and bottom perspective views of the chip, respectively. The actuated cantilever chip 1 comprises a handle substrate 3, an actuated cantilever array 5 and an ensemble of conductive traces 7 forming electrical circuits between the probes and the corresponding electrical contact pads 9.

Figure 21:
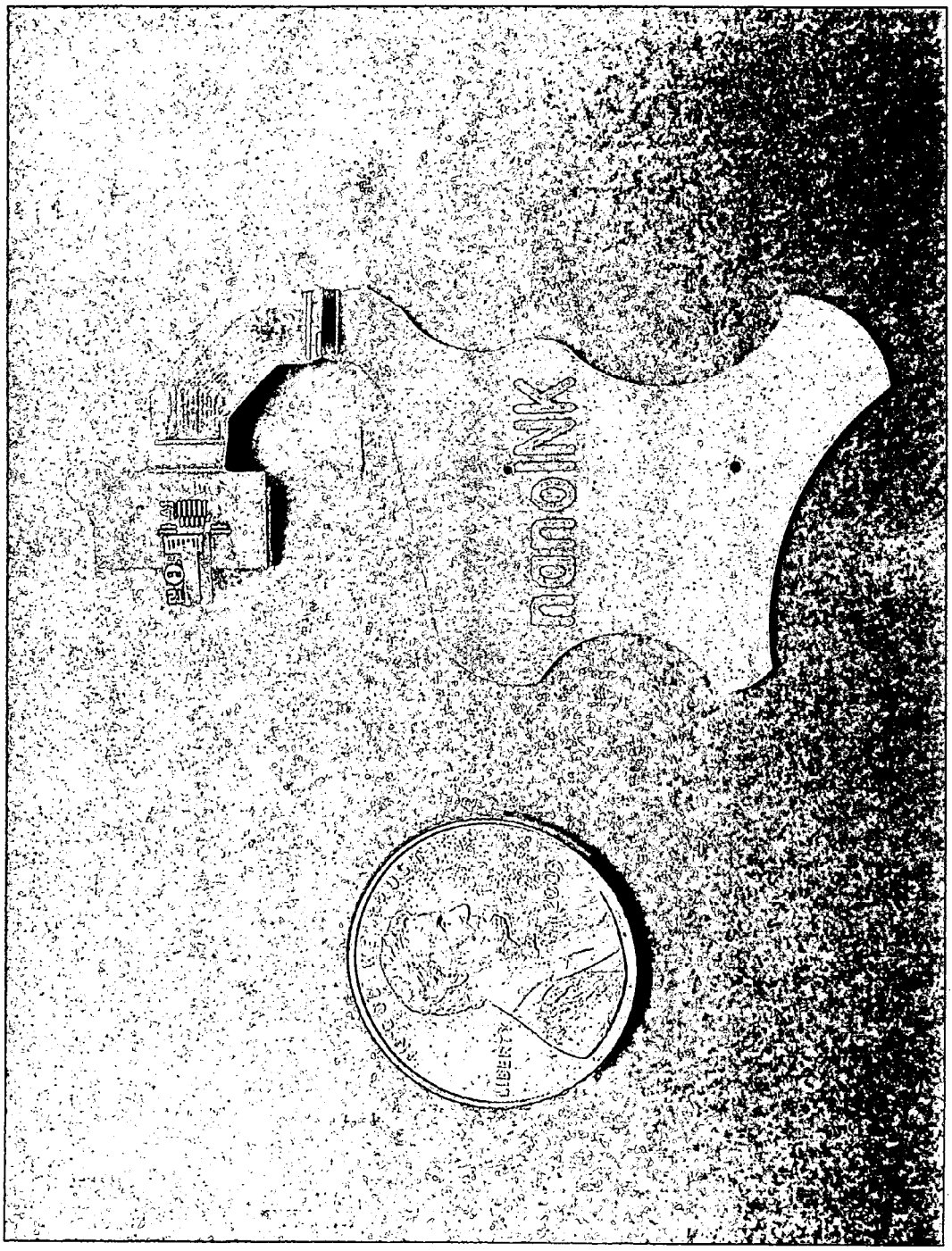
FIG. 21 shows an additional embodiment for the flexible circuit.
Figure 22:
FIG. 22 shows a size comparison with a penny.

The chip also can comprise a sloped region 11, which can provide easy optical access to the probe array. The sloped region may be a set of ridges sawn into the substrate at increasing depths towards the edge, as illustrated in FIG. 1A, or it may be smooth, for example prepared by anisotropic etching of the (silicon) substrate. The chip may also include a logo, part identifier (not shown) or some other indicia. The handle substrate can be but does not need to be rectangular. The handle substrate can have cuts. This can help avoid premature contact between the chip and the surface if the edge of the chip is not parallel to the surface. See for example FIG. 21. In addition, FIG. 22 provides a size comparison with a US penny.

The substrate 3 is preferably fabricated out of a silicon or borosilicate glass wafer (e.g. Pyrex, a product of Corning Corp., Corning, N.Y.) but may be from another material compatible with semiconductor processing, such as sapphire or fused silica. If silicon is used in conjunction with wet etching, a corner compensation scheme may be used to avoid rapid erosion of the chip corners (see, for example, P. Enoksson, J. Micromech. Microeng. 7 (1997) 141-144; C. Yang et al., Sensors and Actuators A 119 (2005) 271-281; M. Chahoud, Sensors and Actuators A 117 (2005) 356-363); and Chu et al., 2004, IEEE, pages 253-256. The substrate may have the same form factor as commercial passive probes or it may be larger. The handle substrate can be substantially rectangular or it may have a narrow portion near the actuated probe array. When the chip is brought in proximity with the substrate in order to contact the cantilevers with the substrate, having a narrow portion makes the setup less sensitive to misleveling of the chip.

The actuated probe array 5 may be fabricated separately from the handle substrate and bonded to it at a late stage of the fabrication process. For example, the probe array 5 may be fabricated from a silicon-rich silicon nitride thin film with e.g. metal patterns. In such case, the cantilever beams may be connected to a stub 13 like the teeth of a comb and (portions of) the stub connected to the handle substrate. The stub may occupy a small portion of the handle substrate, as suggested in FIG. 1B, or it may cover a significant area of the handle substrate.

The contact pads 9 are adapted to forming electrical contacts with, for example, an external printed circuit board, green tape cofired ceramic package or other macroscopic interconnection device, as discussed below. The contact pads may be located on the top, the bottom or the edges of the cantilever chip. The conductive traces 7 are adapted to electrically connect the stub 13 to contact pads 9.

For ease of manufacturing, the contact pads 9 are preferably on the same side of the cantilever chip as the probe array (e.g., as shown in FIG. 1B) and can be electrically connected via (thermosonic) wire bonding, a method known in the art of connecting semiconductor die packaging. In such case, the size of the chip substrate 3, the location of the pads 9 and the pitch angle of the actuated cantilever chip (relative to the sample) can be chosen in such a way that the wires that connect the chip to external circuitry do not touch the sample before the actuated cantilever contact it. In this example, the contact pads are placed near the edge of the cantilever chip that is farthest away from the probe array. The contact pads and the traces can be made larger and with different geometries for particular applications.

In an alternative embodiment, the contact pads are placed on the opposite side of the handle wafer (relative to the probe array) and are connected to an external device in a way similar to ball grid array/land grid array connectors. In such case, traces 7 may run on both side of the handle wafer and may be connected by vias through the substrate.

Figure 2:
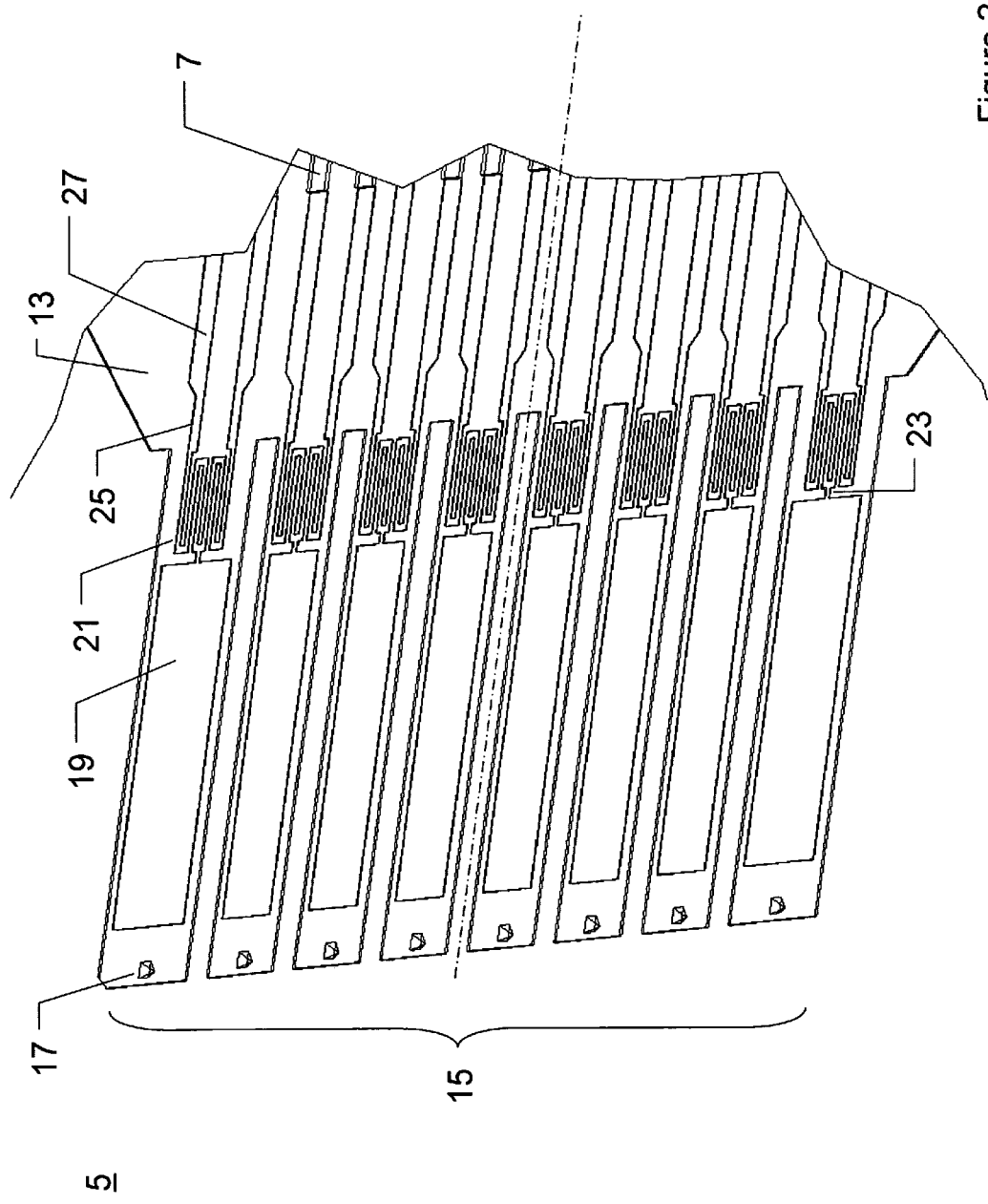
FIG. 2 is a schematic diagram of an actuated cantilever array.

The actuated probe array, an example of which is shown in further detail in FIG. 2, may comprise an array of cantilever beams 15, each one comprising an integrated tip 17 at their distal end, a bimorph element 19 (also called "heat spreader") in good thermal contact with a heater 21. If desired, the heat spreader or the metallic part of the actuator bimorph can be moved back away from the tip to reduce heat transfer.

Figure 3:
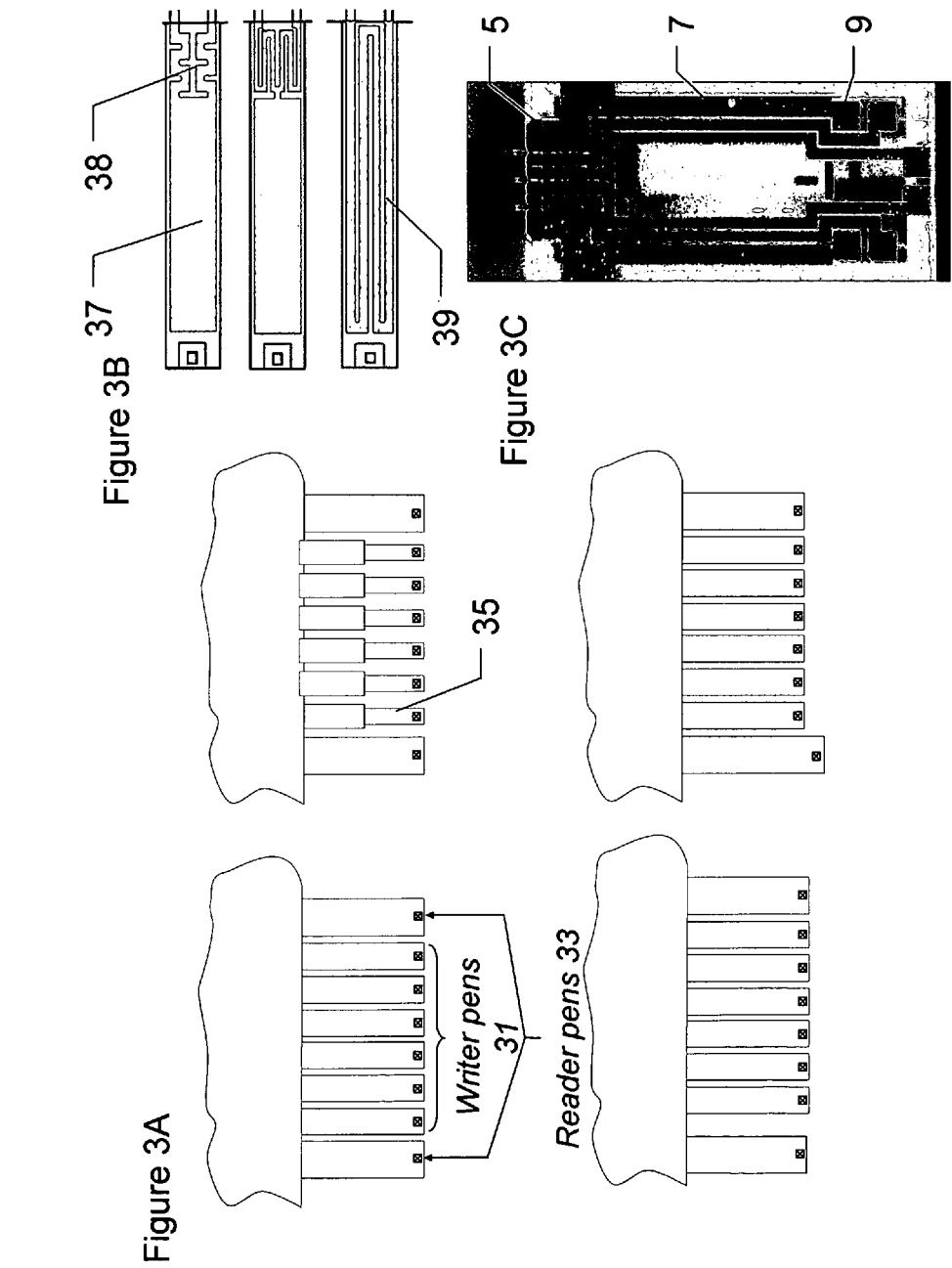
FIG. 3 illustrates possible variants in the layout of the cantilever array, heater, bimorph element and electrical interconnections.

The cantilever beams 15 may be triangular in shape, similar to the frame of an "A" or, preferably, elongated and rectangular. They may also comprise a narrow section near their distal end and a wider section near the substrate, as illustrated in FIG. 3A (35). This design maximizes stiffness while reducing the risk of liquid wicking from one cantilever to the next during delivery of fluid(s) to the tips of cantilevers (described below).

The cantilever array 15 may comprise similar or dissimilar cantilevers. In a preferred embodiment, the array comprises at least one "reader pen" meant as a force-sensing cantilever or as a contact sensor. Reader pens 33 in FIG. 3A can be made slightly wider than the other cantilevers 31, which are called "writer pens". They may also be laterally offset relative to or made longer than writer pens. When the actuated cantilever array is used in a traditional Atomic Force Microscope (AFM) instrument, such design precautions facilitate the focusing of the instrument's laser beam on their metal-coated backside by the operator and avoids parasitic reflections of said laser on the nearby sample surface. The reader pen on which the laser is focused (thus which force against the sample is kept constant by the instrument's feedback loop) is called the "feedback probe." Reader cantilevers 33 may be placed in the center of the probe array or at its edge (e.g., FIGS. 2 and 3A). The latter design facilitates the detection and correction of cantilever tilt (about its longitudinal axis, shown as a dashed line in FIG. 2). For example, the cantilever may be deliberately tilted before it is brought in contact with the sample to pattern, ensuring that a given edge reader cantilever, chosen as the feedback probe, contacts first. In a second example, a cantilever array with edge reader probes may be used with an instrument that would comprise at least two laser beams and quadrant photodiode detectors, thus that is capable of simultaneously measuring the optical deflection of multiple cantilevers, hence of automatically compensating for tilt.

Writer pens 31, in contrast, are designed as narrow and tightly spaced as possible, in order to maximize the work area that is accessible by all pens by simple use of the AFM fine XY translation mechanism (usually a piezoelectric actuator) without use of the coarse and non-repeatable translation mechanism (usually a motorized stage).

Tips 17 may be substantially pyramidal or conical in shape. High-aspect-ratio tips may be fabricated; for example, tips may be subjected to focused ion beam (FIB) etching or deposition of a (carbonaceous) needle with an electron beam, in order of being able to pattern in high-aspect-ratio trenches. Alternatively, tips may be cast from high-aspect-ratio molds prepared with excimer laser ablation, FIB or RIE followed by oxide sharpening, as detailed below. The tips and/or cantilever beams may also be subjected to a surface processing to improve the retention and distribution of inks on their surfaces. The cantilevers 15 may incorporate other aspects for ink storage and delivery, for example a slit placed in close proximity to or within the tip.

The heater 21 may be fabricated with the same or a different material than conductive traces 25 and heat spreader 19. In a preferred embodiment, electrical traces 25 narrow into a serpentine wire forming the thin-film resistor 21. When an electrical current is supplied, the metallic neck 23 conducts the generated heat to the bimorph element 19. It expands at a different (typically higher) rate than the underlying cantilever material and thus bends it (towards the sample).

Non-limiting examples of alternative designs of the heater and bimorph element are shown in FIG. 3B. For example, 37 functions as both a bimorph element and a heating element part of resistor 38. Serpentine circuit 39 extends throughout the cantilever.

The thermomechanically actuated cantilever circuit comprising 19, 21 and 25 may be fabricated at the same or at a distinct process step and on the same or a distinct wafer than traces 7. In a preferred embodiment, a first circuit can be fabricated on the stub 13 and cantilevers 15, then thermocompressively bond with a second pattern forming 7 and 9 on the handle substrate 3. Overlapping regions 27 simultaneously complete the electrical circuitry and form a mechanical bond that holds stub 13 and handle 3 together. The stub 13 (and optionally other regions of the probe wafer) may include "anchor" patterns (not shown), which primary function is to increase the wafer bonding area, thus ensure sufficient strength of the bond during the fabrication process. In another example, the entire electrical and thermal circuit may be formed on one substrate and transferred to the handle substrate in a later step, for example with the help of adhesive bonding.

FIG. 3C is a photograph of a three-cantilever chip according to the preferred embodiment, including thermocompressively-bond cantilever array 5, cantilever traces 7 and contact pads 9.

The DPN printing process may be further scaled up by utilizing high-probe-count probe arrays. For example, such an array with over 1.3 million passive probes has already been built (NanoInk, Inc.) and used as a massively parallel stamper. Therefore, in another embodiment, the invention provides a massively parallel array of actuated probes. The array may be, for example, a two-dimensional array of actuated cantilevers. The array may include, for example, 1,000 probes or more, or 10,000 cantilevers or more, or 100,000 cantilevers or more.

The active pens can be engineered to bend toward the substrate or bend away from the substrate, with the former in some cases being preferred. The Rosner et al. SPIE paper, cited above, describes additional thermal bimorph topologies which can be fabricated (see, for example, FIG. 6). Heating of the ink can provide for faster ink transport. The active probes can be characterized further before integrated into a complete system. For example, performance can depend on electrical properties of the different heater designs, cross-talk between probes, repeatability of actuation, actuation stroke at different power levels, variation in stroke for identically-designed probes, and decrease in response for increasing actuation frequency and fatigue.

Additional Design Embodiments for Electrostatically Actuated Cantilevers

The microfabrication processes can also be used to produce actuated microcantilevers that do not rely on the thermomechanical effect for actuation. That includes but is not limited to phase-change, piezoelectric or electrostatic actuators. The software and hardware configurations described above can be used to control these actuators, for example, for dip pen nanolithography with heat-sensitive compounds such as biomolecules including proteins and nucleic acids. U.S. Pat. No. 6,642,129 to Liu et al. describes electrostatic actuation.

For example, an electrostatically actuated cantilever can comprise (1) a silicon nitride beam connected to a silicon or Pyrex handle substrate, (2) a silicon nitride oxide-sharpened tip located on the beam, and (3) at least two conductive electrodes. One of the electrodes can be located on the cantilever and another can be located on the substrate in proximity to the first electrode. The electrodes are preferably metallic and may be coated with a thin insulating layer to prevent electrochemical and electrical discharge phenomena.

In another embodiment, a method of fabrication of actuated probes for direct write nanolithographic printing comprises the formation of tip molds by e.g. anisotropic etching of a patterned probe silicon wafer; optional oxidation sharpening of said molds; the deposition of silicon-rich silicon nitride by e.g. low pressure chemical vapor deposition and patterning using photolithography and etching to form cantilevers and tips; the sputtering and etching of layers of chromium, platinum and gold (or other conductive stack) to define a first set of electrodes, bonding areas and associated wiring on said cantilevers and/or tips; the patterning of a glass or silicon handle wafer with e.g. chromium, platinum, gold patterns forming another set of electrodes, bonding interconnected areas, wiring, and contact pads; the optional deposition and patterning of an insulating layer (such as 1000-2000 Å of PECVD SiNx or an oxide) on top of the first and/or second sets of electrodes on said probe and/or handle wafer; the thermocompressive bonding of said probe wafer to said handle wafer using said bonding areas so that (a) the first set of electrodes is in close proximity with the second set of electrodes, forming e.g. plate capacitors, and (b) the first electrodes on the cantilevers are electrically connected to wiring and contact pads on the handle wafer; and the release of said cantilevers by etching of the probe wafer. In operation, an electrical voltage is applied between at least one electrode on a given cantilever and at least one electrode located on the substrate, resulting in an attractive force between the cantilever and the substrate and therefore motion of the cantilever. The insulating layer, if deposited on the cantilever, may be deposited under proper compressive or tensile stress, so that after release it results in sufficient bowing away from counter electrode and avoid adhesion of the cantilever to the substrate.

Embodiment 2

Flexcircuit In a second embodiment, the invention provides a cartridge for handling a probe chip and electrically and/or mechanically coupling to a lithography apparatus, for example an atomic force microscope-type instrument. For example, said cartridge may secure the probe chip to e.g. one end of the actuator that provides high-resolution X and Y positioning in the AFM instrument. It may assist the user in repeatedly and reliably placing the probe chip in registration with other elements of the instrument, such as the video microscope or a laser beam used for cantilever deflection measurements. It may electrically connect said probe chip or its accessories to the instrument electronics.

Preferably, both the mechanical and electrical interconnections are reversible and rapid, allowing easy installation or replacement of the cartridge by the end user during instrument operation. If possible, the electrical interconnections should not significantly perturb the stability of the mechanical coupling e.g. by inducing thermal drift, mechanical creep or excessive vibrations.

The probe chip may comprise self-actuated or sensorized cantilevers and associated elements, which may be electrical or microfluidic in nature (for example, the electrical circuit 7 and 9 or integrated microfluidic ink reservoirs or channels). Preferably, the probe chip is suitable for scanning probe lithography and microscopy, including but not limited to Dip Pen Nanolithography printing. The cartridge may include, in addition to the MEMS (microelectromechanical system) probe chip, additional microfluidic or electronic components or circuits, including any important electrical, pneumatic or microfluidic connecting elements. Preferably, electrical connections provide the power and control electrical signals to self-actuating/sensorized probes on said probe chip.

Figure 4:
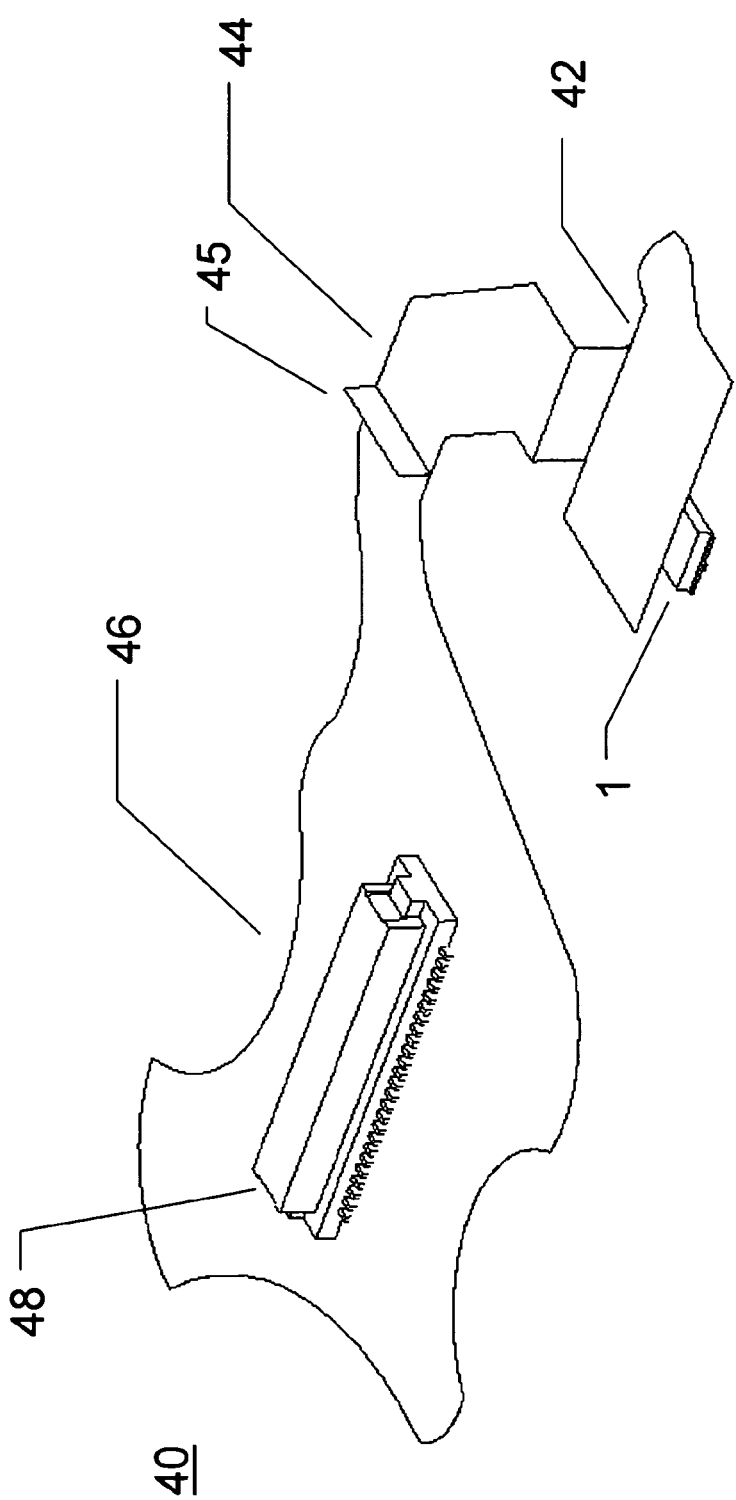
FIG. 4 is the schematic diagram of a "flexcircuit" device that electrically interconnects and mechanically couples an actuated probe array to the rest of the instrument.

The cartridge may comprise a printed circuit board, a substrate prepared by standard microfabrication methods, or a custom carrier. In a preferred embodiment, the invention provides a cartridge configured as a flexible circuit ("flexcircuit") assembly. Referring now to FIG. 4, the flexcircuit 40 comprise (a) an actuated cantilever chip 1 supported by stiffener 42, itself mounted on a mechanical coupling means (43, not shown); (b) a flexible ribbon 44 comprising zero or more bends 45 (for extra suppleness); and (c) a second stiffener 46 comprising at least one high-density electrical connector 48. The flexcircuit can be chosen for its low inertia and its low height, which maximizes clearance to the sample.

Ribbon 44 is, for example, a kapton film, which ensures electrically connectivity but mechanical decoupling of the stiffeners 42 and 46, which are typically small FR-4 printed circuit boards (PCBs). An array of conductive traces forming a high-density printed circuit bridges the two PCBs via the ribbon 44 and links the electrical inputs of the probes to board-to-board connector 48 (0.5 mm pitch typical).

The stiffener 42 has optionally an adhesive backing secured on mechanical coupling means 43, for example a metallic strip that fits on the magnetic-mount head of the high-resolution scanner of the AFM instrument. Alternatively, 43 may be a 3-point kinematic mount.

The flexcircuit may be mass-produced, since printed board circuit fabrication and wire bonding are easily automated. They are also relatively inexpensive.

Figure 5:
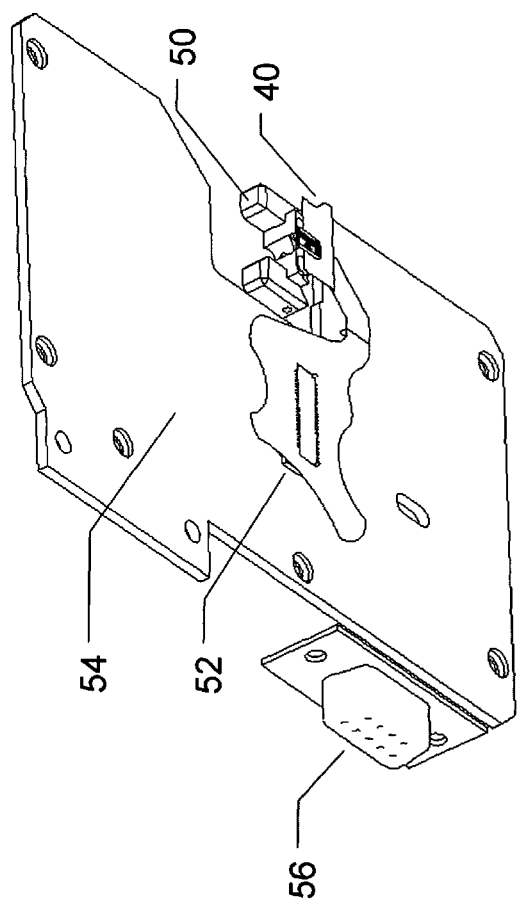
FIG. 5 schematically illustrates the electrical connections of the flexcircuit to a cable assembly via an intermediate printed circuit board assembly. It also shows the mechanical coupling of the actuated probe array to the head of a piezoelectric scanner.

Referring now to FIG. 5, the flexcircuit 40 is shown positioned above the scanner head 50 and electrically connected via high density board-to-board connector 52 to the intermediate circuit board 54 (sometimes referred to as the "scanner backplate"). 54 is itself connected to one or more cable assembly/ies (for example via bulky connector 56) to one or more cantilever driver board(s).

Compared to prior art, the flexcircuit may be easily installed in or removed from the instrument. The shape of stiffeners 42 and 46 may be selected to favor the prompt positioning of the actuated cantilever chip on the instrument head and the risk-free handling of the fragile active probe chip. Stiffeners may include, for example, a tab or finger-placement slits for proper manipulation. With this system, no wires need to be soldered or otherwise affixed one-by-one. Snapping the flexcircuit connector 48 into its mate 52 on the scanner backplate connects for example 3 or more electrical circuits and especially 25 or more circuits at the time, each one corresponding, for example, to the leads of an active cantilever. It is therefore easy to control a relatively large array of independently actuated cantilevers without undue experimental burden.

Figure 6:
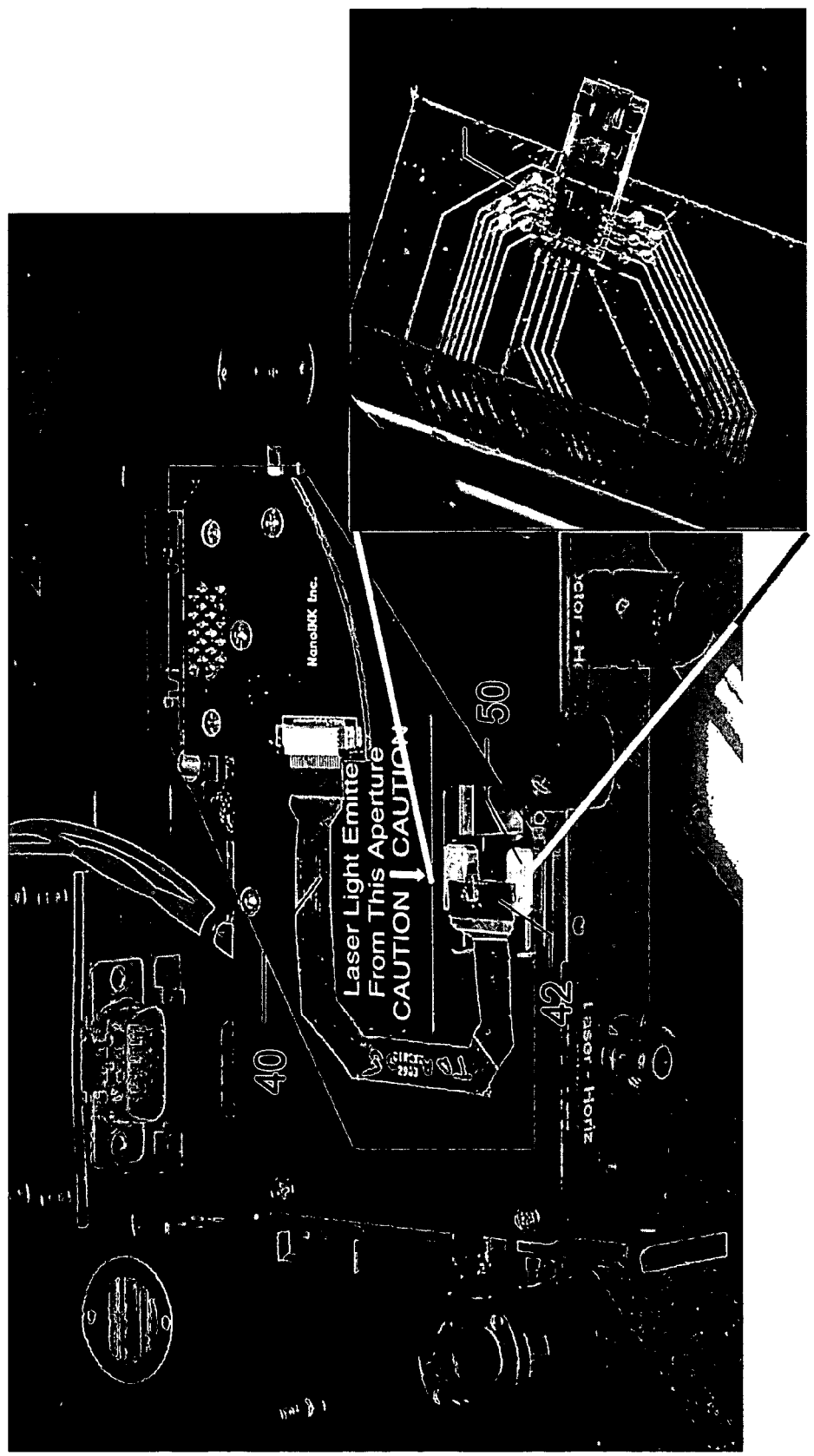
FIG. 6 is a photograph of an embodiment of the flexcircuit and printed circuit board assembly.

FIG. 6 is a photograph of a flexcircuit and intermediate circuit board assembly according to the invention. An active pen chip 1 wire-bonded onto a flexible circuit assembly 40 that carries actuation signals from the cantilever driver board to the probes. In this embodiment, the edge of the flexcircuit, which comprises naked copper traces, fits a flexcircuit-to-PCB connector is a zero-insertion, 0.5 mm pitch type, fabricated for example by SAMTEC. The intermediate printed circuit 60 connects to a cable assembly using a board-mounted mini-D ribbon connector (fabricated e.g. by 3M Sumitomo). The photograph insert shows the details of thermosonic wire bonding 62 between the contact pads placed at the periphery of the cantilever chip 1 and termini of the flexcircuit. For maximum clearance between the chip and the sample, the wire bonding order may be inverted; the wire (which is terminated by a small metal ball formed when cutting the wire) is contacted first with the PCB and is then thermosonically soldered on the probe chip, forming a low-profile wedge.

The flexcircuit is further shown and described in the Rosner et al. SPIE paper including for example FIG. 8.

Embodiment 3

Instrument Comprising Actuated Cantilevers

In another embodiment, the invention provides an instrument that comprises the actuated cantilevers described in previous embodiments; a piezoelectric scanner capable of fine controlled motion along the X, Y, Z axis; actuated cantilever control means comprising electronics controlled by a computer; and a sample holder. It also provides an instrument that comprises the flexcircuit disclosed in a previous embodiment, said flexcircuit carrying a least one probe chip, said probe chip comprising actuated or/and sensorized cantilevers. A preferred nanolithography instrument is the NSCRIPTOR available from NanoInk, Inc. (Chicago, Ill.).

Figure 7:
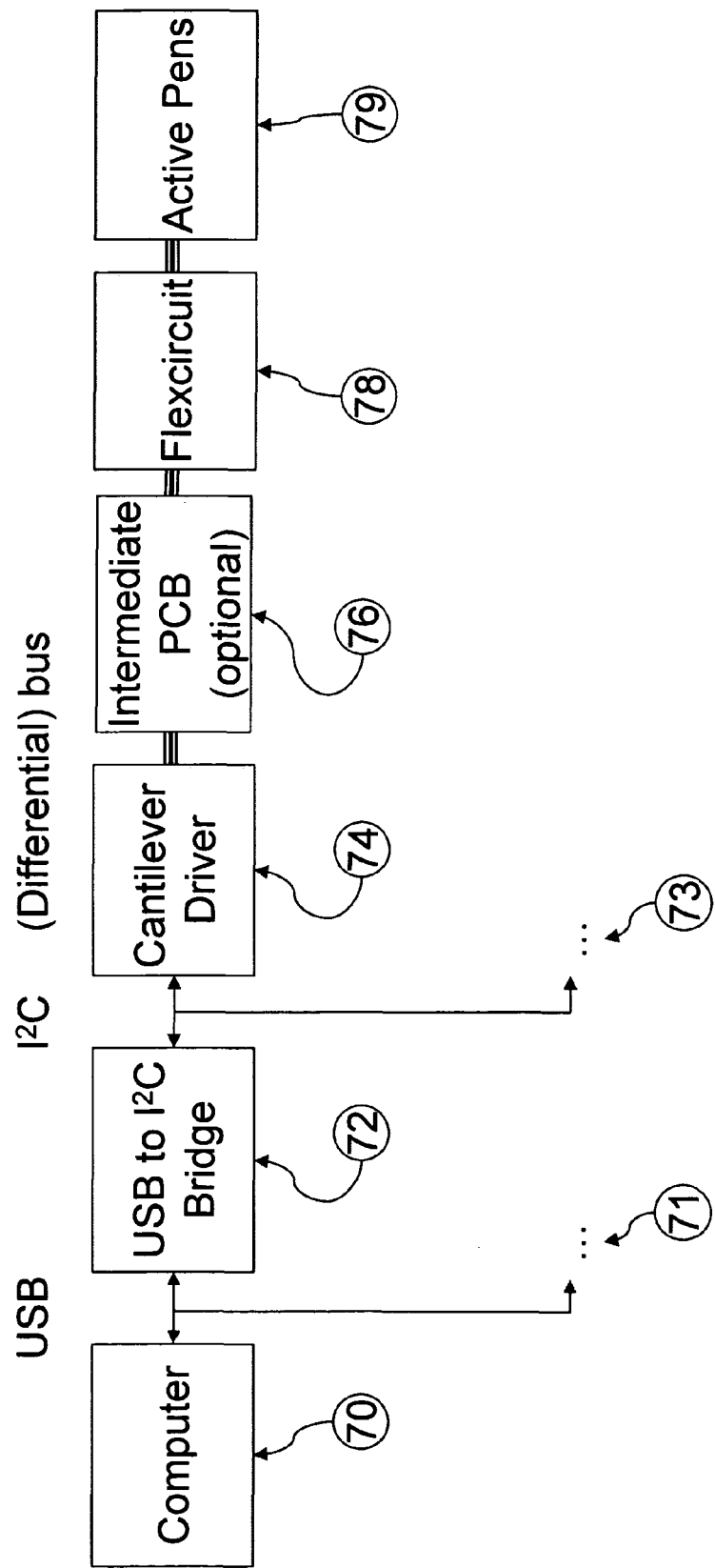
FIG. 7 schematically illustrates the actuated probe control electronics and circuitry.

In a preferred embodiment (e.g., FIG. 7), the control computer 70 is connected via a USB serial communications link to at least one USB-to-I$^2$C bridge card 71, 72 located e.g. in the instrument hood. I$^2$C is a 2-wire serial communications standard known to the art and adapted to bidirectional communication within an instrument or appliance. An I$^2$C cable assembly connects the bridge card(s) to at least one cantilever driver board 73, 74.

In operation, the computer 70 sends command strings to the USB-to-I$^2$C card 72, which translates it into I$^2$C commands and passes them to the custom cantilever driver card's I$^2$C input. One or more digital-to-analog converters (DAC) receive and interpret these commands. Each output of the DAC(s) drives the input of an analog driver stage, which are connected to a corresponding actuated cantilever in chip 79 via a (differential) bus and optional intermediate PCB 76, flexcircuit 78. Preferably, the analog driver stages are constant current sources. The output driver signal utilizes DDS (Direct Digital Synthesis) and therefore can generate any preferred value or waveform shape.

Utilizing the standard USB port on a PC allows for easy scaling of the system (71, 73) at very little cost, as the system can be expanded with a standard USB hub. The USB command strings are converted to the I$^2$C bus protocol to allow the use of commercially available DACs and ADCs. Again, with proper addressing, multiple I$^2$C cards may be connected to a single bridge, offering more opportunities for scaling.

Embodiment 4

Software for Controlling Actuated Cantilever Arrays

In another embodiment, the invention provides software, hardware (or a combination thereof) to control the actuated probe chip in conjunction with other actuators and sensors, such as the head of an Atomic Force Microscope, in order to pattern a sample especially using Dip Pen Nanolithography.

Figure 8:
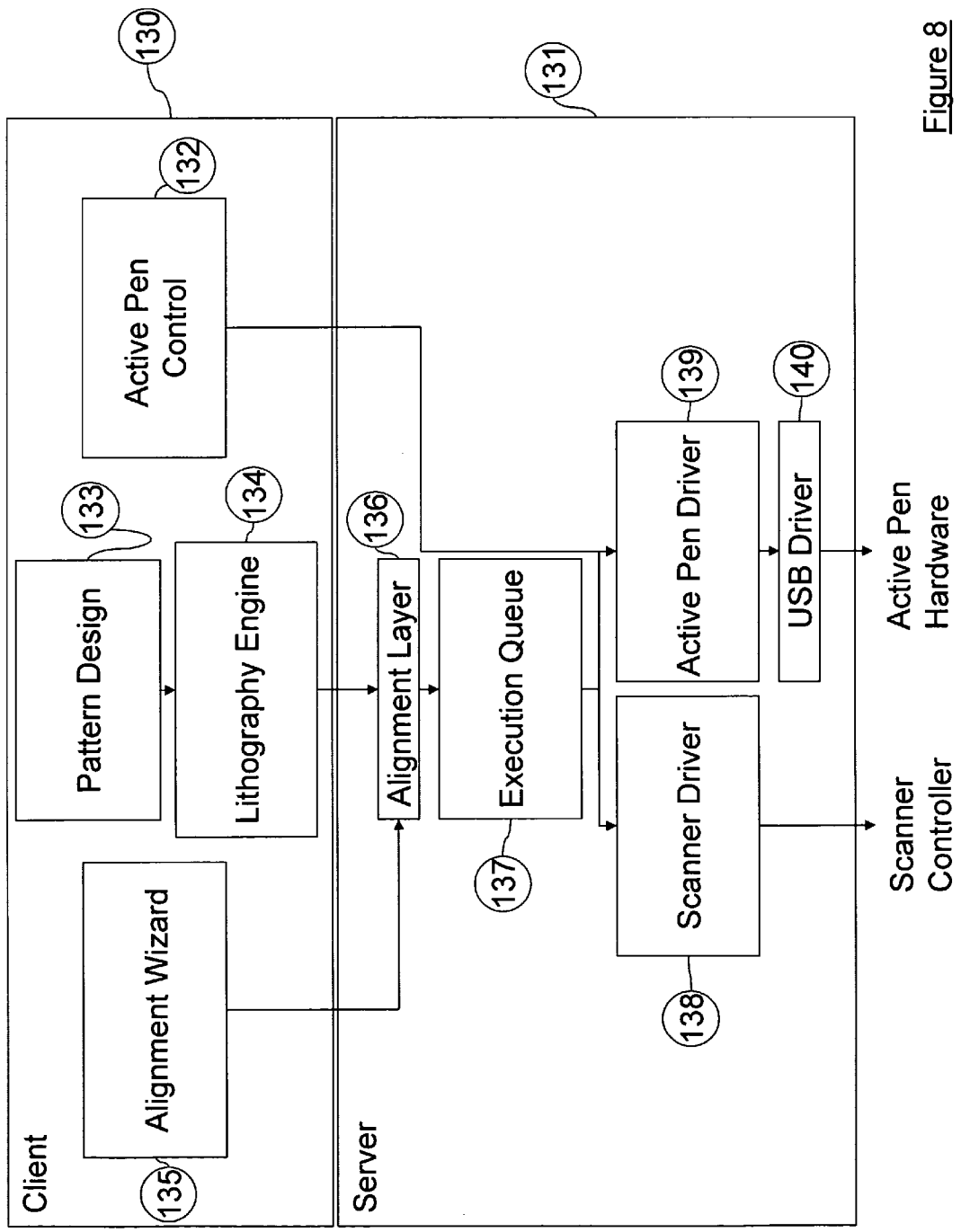
FIG. 8 is a schematic representation of the software system to calibrate and control a scanning probe nanolithography instrument comprising an actuated probe array.

Referring now to FIG. 8, the inventive software may provide a client 130 and a server 131. The client may provide a user interface, while the server is a substantially non-interactive software operating in the background, which (a) communicates with and controls the hardware; and (b) guarantees the orderly execution of hardware command sequences sent by the client. For the purpose of actuated pen control, the client may be roughly subdivided in an active pen control module 132, pattern design module 133, lithography engine 134 and tip-to-tip alignment wizard 135. The server modules include but are not limited to an alignment layer 136, execution queue 137, scanner and active pen drivers 137 to 140.

With the Active Pen Control module 132, the user may manually control each actuated probe individually. For example, the user may define and test what values of the control voltage(s) or current(s) should be applied to the cantilever actuator to extend or retract it (actuator calibration). The active pen control communicates synchronously with the active pen driver 139, which generate commands for the active pen hardware 72-79 via a USB driver 137.

The alignment wizard routine 135 compensates for (a) pitch variation between probe tips within a passive or active probe array; (b) skew between the probe chip and the scanner respective axes; and (c) offsets resulting from an unequal curvature or extension of the cantilevers within the array. The pitch between tips may deviate from what is specified in the blueprint (typically by a fraction of a micron) as a result of unavoidable MEMS process variation. In addition, the flexcircuit or other cartridge holding the probe chip may not be perfectly positioned on the carrier that connects it to the actuator, or the chip may have rotated during flexcircuit manufacture.

Figure 9:
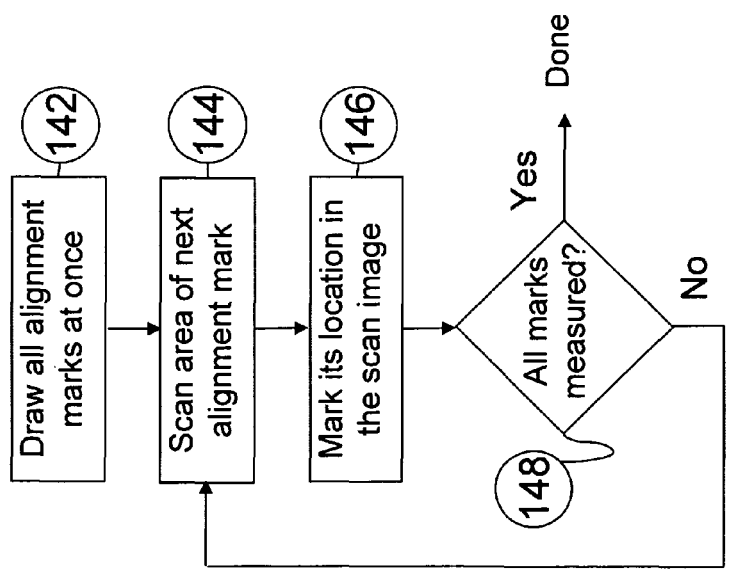
FIG. 9 is a simplified sequence for the tip-to-tip alignment of probe arrays.

The alignment wizard 135 may implement the sequence of steps according to FIG. 9 to compute tip-to-tip offsets for a given probe array.

In a first step 142, at least one alignment pattern is drawn with at least one writing pen. The alignment patterns may be, for example, a cross or a dot. All selected pens may write in parallel and may be extended or retracted as needed during lithography.

In a second step (144), all writing pens are retracted and the reader pen is extended. The reader pen is then translated by the scanner in the vicinity of the first alignment pattern and used to acquire a scanning probe microscopy image of said pattern. The alignment mark is located. For example, the user may mark the location of the current alignment in the scan image using a cursor. Alternatively, an image processing and pattern recognition algorithm may determine the position of the mark. The X and Y offset between the reader probe and first writer probe are then computed and recorded.

The second step is repeated as many times as important to image all available alignment marks (148) and compute all important offsets. If necessary, the skew correction may be extrapolated to writing pens outside of the scanning area of the current reader probe, for example by curve fitting. The computed offsets are then used during subsequent imaging or lithography. For example, the alignment wizard may load the complete offset table into an alignment layer module 136 that adjusts the coordinates of all commands sent to the server.

After setup and calibration of the probe characteristics (actuator deflection and tip-to-tip alignment), the user may define the geometry of the pattern in CAD module 133. The user may also select which probes will operate during lithography and other important experimental parameters. The lithography engine 134 translates the desired pattern geometric design into a sequence of commands, which are then forwarded to execution queue 137. Commands in the queue are asynchronously executed and properly dispatched to the driver for the appropriate part of the instrument (138-140), for example a scanner driver 138 (controlling the high-resolution XYZ actuator) and the aforementioned active pen driver.

The software and/or hardware may also (1) facilitate delivery of ink to active probes by controlling the state (extension/retraction) of the active pen during different phases of (semi-) automated probe inking; (2) provide interlocks that prevent the accidental destruction of the relatively fragile active pen array during operations. For example, the feedback probe may need to be kept in the extended state, when its deflection is monitored by the system feedback loop.

The server 131 and underlying scanner controller may also include an improved tip approach routine that compensate for unwanted variations in cantilever deflection due to long-range interaction with the sample.

The heat dissipation from the bimorph element of a thermomechanically actuated cantilever, hence its temperature, are moderately influenced by the separation between the cantilever and the sample, when this separation ranges from e.g. microns to e.g. hundreds of microns. Therefore, during approach, the curvature of an actuated feedback cantilever tends to vary and may saturate the optical deflection monitoring system used to detect contact with (or close proximity to) the sample. Other effects may contribute to deflection detector saturation, including long-range (electrostatic) forces between electrostatically charged cantilever and sample.

Rather than forcing the user to manually readjust the cantilever rest position at multiple intervals during approach, it is advantageous to devise an automatic actuated cantilever compensation algorithm that distinguishes between the moderate, slow deflection variation due to long-range interactions and the fast, steep variation due to hard contact between the tip and sample surface. Said compensation may occur at regular intervals or continuously during the approach sequence. For example, a feedback loop may keep the cantilever deflection constant and equal to its initial value during approach. When the output of said feedback loop (the cantilever actuation signal) and/or its rate of change exceed given thresholds, the cantilever approach is stopped or slowed down. Alternatively, the cantilever deflection and/or its derivative (rate of change) may be monitored during coarse approach and the approach stopped when the cantilever deflection or its rate of change exceeds a pre-determined threshold. In a second alternative, the cantilever deflection is kept constant by a first feedback loop while the absolute proximity to the sample is monitored with a second proximity sensor, for example a capacitive or eddy current sensor.

The software routines described in this embodiment are preferably implemented using the .NET framework and COM technologies from Microsoft Corp., Redmond, Wash.

A person skilled in the art can recognize that the actuated probe flexcircuit, the instrument using said flexcircuit, and the software controlling said instrument may be used for other purposes than the control of actuated cantilevers. Other types of smart probes, e.g. comprising sensors, including deflection sensors, temperature sensors and mass sensors, or regulating the deposition of a compound or mixture by a different method than interrupting the contact between the tip and the sample, are included in the present invention. For example, the following reference (Sheehan et al., Applied Physics Letters, 85(9), 1589-1591, Aug. 30, 2004, "Nanoscale Deposition of solid inks via thermal dip pen nanolithography") proposes a patterning method, in which a microminiature probe with integrated resistive heater locally melts a chemical compound or mixture deposited on its tip to control its deposition. Literature that allows practice of this embodiment include U.S. Pat. Nos. 4,747,698 to Wickramasinghe, 5,047,637 to Toda, 5,356,218 and 5,388,323 to Hopson, 5,835,477 to Binnig et al. and 5,929,438 to Suzuki et al. In addition, PCT application WO 2004/044552 discloses a probe array system containing at least one ink reservoir, the flow from which onto the probes is controlled electrically.

Embodiment 5

Patterns Fabricated Using Actuated Cantilevers

In another embodiment, the invention provides patterns fabricated by the actuated cantilevers disclosed in previous embodiments. Such patterns may include dots, lines, or combination thereof forming arbitrary patterns on arbitrary surfaces using arbitrary inks. It may include patterns written by multiple pens using multiple inks.

Figure 10:
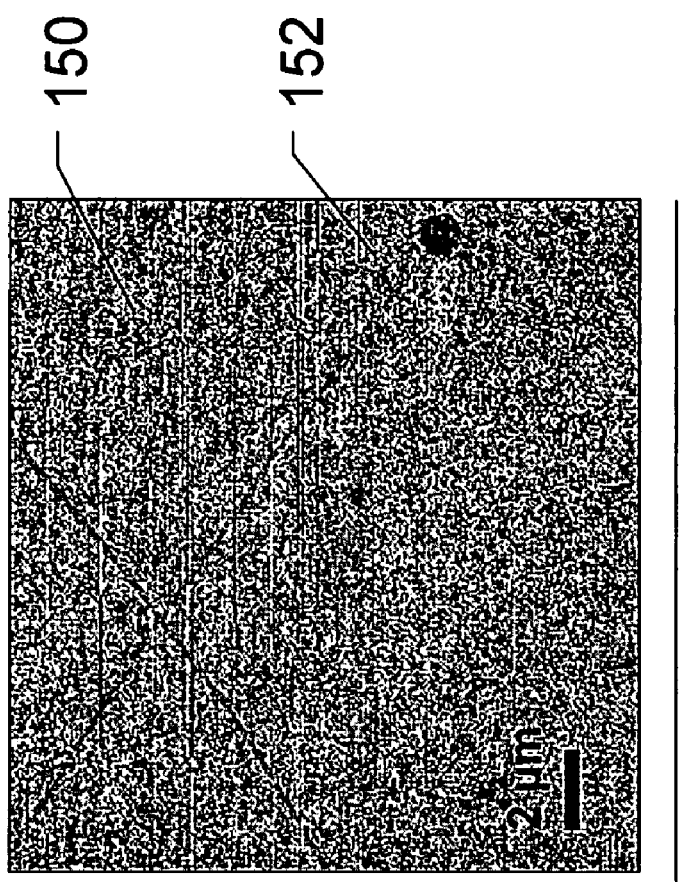
FIG. 10 is an Atomic Force Microscope image of a pattern prepared by Dip Pen Nanolithography with a thermally actuated cantilever.

Referring now to FIG. 10, patterns of mercaptohexadecanoic acid (MHA) were deposited on a gold substrate by means of a silicon nitride actuated cantilever fabricated by the gold thermocompression bonding method (see below). First, the tip of an actuated probe was contacted near the edge of a wet polydimethylsiloxane (PDMS) block previously immersed in a solution of mercaptohexadecanoic acid in octanol for 24 hours. Second, the tip was approached to a gold sample 150 placed in proximity and moved across the surface at a slow rate of speed (a couple of micron per seconds) to fabricate a cross-like pattern of MHA, which can then be observed by AFM imaging in lateral force mode (152). The dot in the lower right corner is the initial contact point of the probe and sample.

Part B: Methods of Fabrication of Actuated Probes, Tips and Inkwells

Embodiment 6

Methods to Fabricate Actuating Cantilevers with Anodic Bonding

The aforementioned U.S. Pat. Nos. 5,221,415 and 5,399,232 to Albrecht et al. and the article entitled "Microfabrication of Cantilever Styli for the AFM", J. Vac. Sci. Technol. A8 (4) July/August 1990 disclose a process for making passive AFM cantilevers with integrated microcast tips, which utilizes anodic bonding. However, the probe wafer, which serves as tip mold and substrate for the cantilever during fabrication, must be subjected to a high temperature oxidation (1100° C. steam annealing for 4 hours) to prepare for anodic bonding, and the handle wafer can be a borosilicate glass plate (e.g. Pyrex™ or Borofloat™ by Schott) and not silicon, which is more easily micromachined and thus preferred.

Therefore, in another embodiment, the invention provides an improved method for fabricating scanning probe microscopy and lithography probes that combines Albrecht's process and a thin film variant of the anodic wafer bonding process. The process typically does not require a Pyrex handle wafer, nor high-temperature preparation of the probe wafer. The use of thin glass film also allows the use of much lower voltages during the anodic bonding process.

A typical process is described below: After oxidizing a first <100> silicon wafer (the probe wafer), square openings are defined in the oxide. The oxide serves as a mask during a short etch of the exposed silicon in a KOH solution to form pyramidal etch pits bound by {111} planes. The oxide is stripped, after which an optional second oxidation is performed to provide a sharpening contour to the inside of the tip molds. A layer of low stress silicon nitride is now deposited on the wafer. The etch pits serve as molds for the formation of silicon nitride tips. The nitride layer is then lithographically patterned and etched to define cantilevers and the associated stub. Successive metal layers are then deposited for example by e-beam evaporation, then patterned using lift-off to define the entire electrical circuit, from the bimorph elements to the contact pads. These metal layers may include an adhesion layer, a conductive layer and a diffusion barrier that prevents diffusion of the adhesion layer material into the conductive layer. For example, the metal layers may include Cr, Pt and Au. A thin film of sodium- or potassium-doped glass is then formed on top of the probe wafer. Possible deposition processes include sol-gel deposition ("Anodic-bonding on glass layers prepared by a spin-on glass process: preparation process and experimental results." H. J. Quenzer et al., Transducers '01, Eurosensors XV, the 11$^{th}$ International Conference on Solid State Sensors and Actuators, Munich Germany, 2001) or sputtering ("Low temperature electrostatic silicon-to-silicon seals using sputtered borosilicate glass", J. Electrochem. Soc. 119(4), 545, 1972). The thin film is patterned and etched to prevent bonding in the unwanted areas. A second (handle) wafer is then bonded to the first one by anodic bonding. Finally the silicon probe wafer is removed by etching, for example in TMAH, or polishing (including chemical mechanical polishing, CMP) followed by etching.

Embodiment 7

Methods to Fabricate Actuating Cantilevers Using Low-Temperature Wafer Bonding

The anodic bonding wafer bonding step itself requires relatively high temperature (475° C.) and high voltage (at least 400 V DC) for long period of times (4 hours). High temperatures may induce undesirable annealing-induced stress in the metallic-thin-film bimorph element results in uncontrolled cantilever curvature. Finally, anodic bonding makes only a mechanical bond, while the formation of electrical interconnections across the wafer bond may be important for cantilevers which are actuated or have integrated sensors.

Therefore, in another embodiment, the invention further provides a process for making probes (e.g. AFM cantilevers and DPN pens) using low-temperature wafer bonding techniques, such as (gold) thermocompression bonding, low-temperature "frit glass" bonding, eutectic metal bonding, or adhesive bonding. These processes reduce or eliminate the need for pre-bonding or bonding processing temperature over 400° C. (most are 300° C. or lower). Possible handle wafer materials include but are not limited to silicon, glass and some metals. There is usually no need for a high electrical field. The process complexity is reduced. Two of these methods (eutectic and thermocompression bonding) form metallic bonds that can be used as both mechanical and electrical connections. "Wafer-to-Wafer bonding for microstructure formation" M. Schmidt, Proceedings of the IEEE 86(8), 1998 reviews existing wafer bonding technologies, including low-temperature ones.

For example, in eutectic or peritectic metal bonding, metals are deposited on the wafers as above. An adhesion layer followed by the primary metal, such as gold, is followed by the low melting temperature metal, such as tin or indium, and then a thin layer of gold to keep the low-melting-temperature material from oxidizing. The other wafer could have a similar stack of metal layer or just the primary metal (such as gold). The metal layers are patterned, the wafers are aligned and the bond is made with temperature and pressure. The temperature can be high enough to melt the low melting temperature metal and consume metal from both wafers. The bond area may freeze by the raising of the melting point of the metal mixture in the bond or by lower the temperature in the bond area after a set time. The bond temperature can be lower than gold thermocompression bonding at the expense of more complicated metal deposition and patterning processes. The following reference may be used to practice the invention: Zavracky, "Patterned eutectic bonding with Al/Ge thin films for MEMS", J. Vac. Sci. Technol. B14 (4) July/August 1996.

Low-temperature glass frit and (plastic) adhesive bonding process similarly with deposition and patterning of the bonding material on one of the two wafers, aligning of wafer pair and application of heat and pressure. These two techniques offer low bond temperatures and low bond pressures but do not necessarily permit simultaneous electrical connections to be made.

Adhesive wafer bonding using (1) BCB (bisbenzocyclobutene); (2) SU-8 resist; and (3) both polymethylmethacrylate (PMMA) and SU-8 are known to the art. Literature that may be used to practice this embodiment include "Effect of temperatures on microstructures and bonding strengths of Si—Si bonding using BCB", Y.-S. Choi et al. Sensors and Actuators A 108, 201-205 (2003); "Rapid MEMS prototyping using SU-8, wafer bonding and deep reactive ion etching" S. K. Sampath et al.; "PMMA to SU-8 bonding for polymer based lab-on-a-chip systems with integrated optics", B. Bilenberg et al. J. Micromech. Microeng. 14(6), 814, 2004; "Fabrication of micronozzles using low-temperature wafer-level bonding with SU-8" S. Li et al. J. Micromech. Microeng. 13, 732, 2003; "Wafer bonding using BCB and SU-8 intermediate layers for MEMS applications", T. Gilinser et al. (EV Group), presented at SEMICON Taiwan 2002; and "A low-temperature wafer bonding technique using patternable materials" C.-T. Pan et al. J. Micromech. Microeng. 12, 611, 2002.

Embodiment 8

Method to Fabricate Actuating Cantilever Using Thermocompression Wafer Bonding

In a preferred embodiment, the invention provides a method of fabrication of thermomechanically actuated cantilevers using a (gold) thermocompression bond. During gold thermocompression bonding, a gold thin film is deposited on the probe wafer and the handle wafer, and then is patterned by etch or lift-off The wafers are then aligned and heated to 300° C. or higher before being subjected to bond pressures in excess of 2 MPa.

The following publications can be used to practice these embodiments with regards to gold-gold thermocompression: "Fabrication process and plasticity of gold-gold thermocompression bonds" C. H. Tsau et al. 6$^{th}$ symposium on semiconductor wafer bonding: science, technology and applications, ECS proceedings (2001); "Characterization of low temperature, wafer-level gold-gold thermocompression bonds", C. H. Tsau et al. Material sciences of Micromechanical Systems Devices II/1999, P. de Boers et al., Eds. 605, p. 171-176 MRS symposium proceedings (2000); "Fabrication of wafer-level thermocompression bonds", C. H. Tsau et al. J. Microelectromech. Sys. 11(6), 2002; "Design and fabrication of a THz nanoklystron" H. M. Manohara. P. H. Siegel et al. Report of the Jet Propulsion Lab (NASA) and CIT, Pasadena, Calif.

Figure 11:
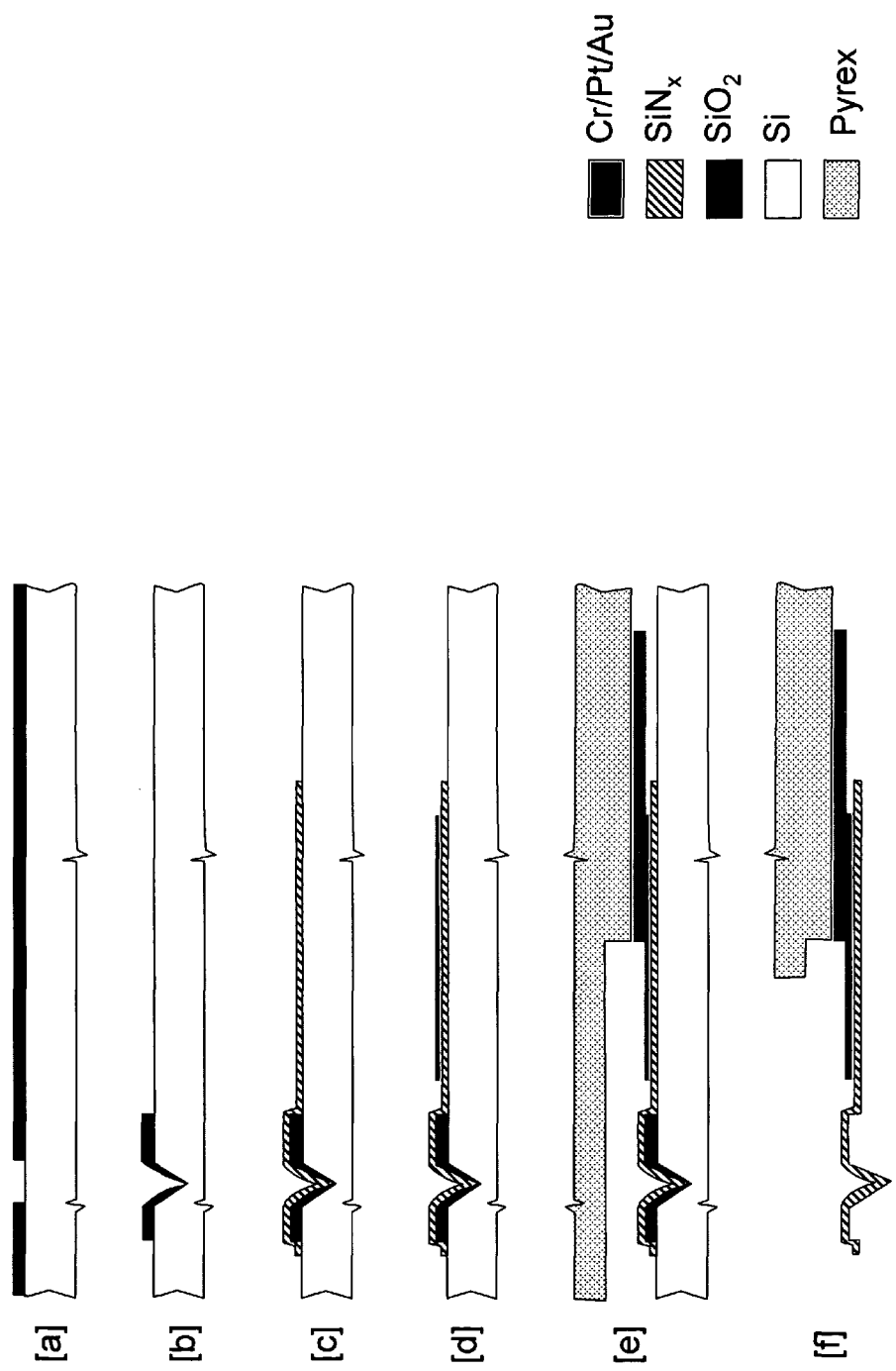
FIG. 11 illustrates the process sequence for manufacturing said actuated cantilever using thermocompression bonding.

An exemplary fabrication process is detailed below and illustrated by FIG. 11:

1) Silicon wafer preparation and cleaning. An n-type, double side polished <100> Silicon wafer, typically 525±10 µm in thickness, is cleaned, for example by immersion in fresh hot Piranha solution and Baker clean, following by rinsing with deionized water and drying.

2) Oxidation of silicon wafers. The wafer is wet oxidized at 950° C. to prepare a 800-1400 Å thick layer of oxide, then cleaned again and inspected under a UV lamp.

3. Tip lithography. The wafer is baked at 150° C. (dehydration) and vapor primed with HMDS. A photoresist (typically S1813) is spun, baked in an oven at 110° C., and exposed to UV radiation in a mask aligner (SUSS Microtech MA6) through a first photomask containing square patterns. The resist is developed (with Microposit 351) and rinsed.

4. Oxide etch. The unprotected oxide is etched in 6:1 buffer oxide etch (BOE) at 22° C. until the wafer backside is hydrophobic. The wafer is then rinsed and the photoresist stripped in refreshed Piranha at 140° C. The resulting pattern in the oxide layer is shown in FIG. 11(a).

5. Tip mold etch. The silicon substrate is anisotropically etched in KOH at 70° C., rinsed, and cleaned in fresh Piranha at 140° C. This step creates concave, pyramidal tip molds.

6. Oxide Strip using 6:1 BOE followed by cleaning and inspection for particulate contamination with a UV lamp.

7. Oxide sharpening by wet oxidation at 950° C. forming a 3800-4000 Å oxide layer.

8. Lithography of the sharpening oxide layer. The oxide layer formed during sharpening is patterned with a second photomask aligned to the first layer then wet etched in BOE (following a process similar to steps 3 and 4). This optional step creates a 10 µm×10 µm frame around the tip which is conventionally used as marker for sharpened AFM probes. The resulting oxide structure is shown in FIG. 11(b).

9. Silicon Nitride Deposition. After photoresist stripping and wafer cleaning, approx. 6,000 Å of low stress (silicon-rich) LPCVD silicon nitride is deposited, forming the cantilever and tip material.

10. Lithography and etching of the silicon nitride layer to form cantilevers After wafer cleaning, a third photomask aligned to the first and second layer is used to pattern a photoresist layer, which is then used as a etch mask for the silicon nitride layer. Etching proceeds in a reactive ion etching chamber using a $CHF_3/O_2$ plasma. See FIG. 11(c).

11. Lithography and etching of the backside silicon nitride layer to form a support ring. A fourth photomask is used to pattern and etch the silicon nitride layer on the back side of the wafer to create a support ring and crossbar. The ring and crossbar provide mechanical rigidity to the wafer after the dicing and release steps. A process similar than step 10 is used.

12. Lithography of the actuator layer. The wafer is prepared for lift-off lithography by successively depositing a lift-off layer (e.g. LOR 3A, Microchem, Newton, Mass.), baking at 175° C. and depositing a photoresist (S1813) followed by baking at 110° C. A fifth photomask is used to patterned the resist. The patterned silicon wafer is then descummed in a Technics RIE instrument using an $O_2$ plasma.

13. Metal evaporation and lift-off. After Argon pre-sputtering, 100 Angstroms of Chromium, followed by 300 Angstroms of Platinum and 4000 Angstroms of Gold are e-beam evaporated. The extraneous metal is lift-off using alternate immersion into a heated stripper bath (e.g. Microposit 1165) and ultrasonic bath until all the overlaying metal is gone. This step completes the preparation of the bimorph element, heater, and wiring on the probe wafer. See FIG. 11(d).

14. Pyrex wafer preparation. Lithography of the chromium layer.

0.525 mm-thick Pyrex 7741 wafer (Corning) suitable for anodic bonding are cleaned in fresh hot Piranha, coated with a thin 2000 Å chromium film, patterned with the help of a sixth photomask and inspected for irregularities. After descumming in an $O_2$ plasma, the unprotected chrome film is wet etched (using Transene chrome etch).

15. Recess etch and chrome stripping. The Pyrex wafer is etched using $SF_6$ RIE to a depth of 4-5 microns using the chromium pattern as a mask. The remaining chromium pattern is then stripped in Transene chrome etch. This optional step defines the position of the probe chip with better precision than the subsequent saw cuts.

16. Lift-off formation of the interconnects. After cleaning the Pyrex wafers in fresh Piranha, a lift-off dual resist (LOR 10A/S1813) is deposited, patterned with a seventh mask, developed in CD 26 developer and descummed. E-Beam evaporation deposits 300 Angstroms of Chromium, followed by 600 Angstroms of Platinum and 1 micron of Gold. The metal overlaying the resist is lifted off as above.

17. Pre-bond saw cuts. Grooves 150 µm in depth are cut on the patterned side of the Pyrex wafer as a preparation for removal of parts of the Pyrex wafer.

18. Bonding of the Silicon and Pyrex wafers. After cleaning of the silicon and Pyrex wafers, a thermocompression bond is performed between the silicon probe wafer to the Pyrex handle wafer at 320° C. and a 5,000 mbar pressure. See FIG. 11 FIG. 11(e).

19. Post-bond saw cut. Further grooves and scribed cuts are cut into the probe/handle wafer stack to remove parts of the Pyrex wafer (in anticipation to die separation) and create a sloped region in the handle wafer in proximity to the cantilever array (for better optical access to the probes during use).

20. Cantilever release. The silicon probe wafer (with the exception of the support ring and crossbar areas) is finally etched in 25% TMAH at 80° C. until all silicon is removed, then rinsed and dried in air. Remaining sharpening oxide may be removed by a brief BOE etch. See FIG. 11 [f]. Individual dies may then be separated.

When a silicon wafer is used as the handle, the following sequence of steps may be used to prepare it:

A boron-doped, dual-side-polished <100> silicon wafer is cleaned and coated with a photoresist, following dehydration bake and vapor priming with HMDS. Photoresist is spun, softbaked in an oven, exposed in vacuum contact through a first photomask, developed, rinsed and inspected. Areas of the silicon that are not coated with resist are etched using $SF_6$ in a DRIE instrument for a short period of time. The resist is stripped and the wafer cleaned. This sequence of steps creates a series of recesses in the silicon that will be located above the cantilevers during bonding, preventing their damage. The patterned wafer is wet oxidized at 1100° C. for 2½ hr. After wafer cleaning, the oxide is patterned and etched in a Technics Micro RIE using $CHF_3/O_2$ to form windows in the oxide layer. The interconnects are prepared as before using lift-off lithography of 300 Å Chrome followed by 600 Å of Platinum and 1 μm of Gold. After wafer cleaning, the handle wafer and probe wafer are aligned using infrared through-wafer viewing and thermocompressively bonded for more than 2 hours at 320° C. and 5,000 mbar. During the release step, unprotected areas of the silicon handle wafer underneath these windows will be anisotropically etched, separating the cantilever chips in one direction and creating a series of triangular grooves in-between dies in the other direction, which will facilitate die separation. If the release etch agent is anisotropic, smooth sloping-down regions are created at the edge of the chip, facilitating optical access to the cantilever.

In summary, after oxidizing a (100) silicon wafer, square openings are defined in the oxide. The oxide serves as a mask during a short etch of the exposed silicon in a KOH solution to form pyramidal pits bounded by (111) planes. These pits serve as molds for the formation of silicon nitride tips. The oxide is stripped, after which a second oxidation is performed to provide a sharpening contour to the inside of the tip molds. A layer of low stress silicon nitride is now deposited on both surfaces of the wafer, lithographically patterned and etched to define cantilevers with the aforementioned pits near their ends. The thermal bimorph actuators are fabricated on the cantilevers from evaporated Cr/Pt/Au layers using lift-off technology. Interconnects and bond pads are similarly formed on a silicon or Pyrex handle wafer, which serves as a final support for the cantilevers, after the bonding process. Finally the silicon probe wafer is removed by etching in TMAH.

While chromium, platinum, gold are preferred metals, other metals or conductors may be used. For example, molybdenum, titanium may be used as an adhesion layer; the diffusion barrier, which is only required for thermocompression bonding for long duration, may comprise palladium and possibly molybdenum and nickel chromium alloys; the thermocompression layer may be realized with other smooth, soft metal layers.

Cold welding is an alternative to thermocompression for gold layers in or freshly out of vacuum. See for example "Template stripping using cold welding" J. Blackstock et al., J. Vac. Sci. Technol. A 22(3), 2004.

Embodiment 9

Tips for Dip Pen Nanolithography

The invention also provides a probe for scanning probe lithography and especially Dip Pen Nanolithography printing that incorporate a tip (or set of tips) designed to prevent wicking during ink delivery. It also provides actuated probes that incorporate an anti-wicking device, including actuated probes with high-aspect-ratio tips. This approach is complementary to the design of improved inkwells discussed below.

In a first embodiment, the invention provides a cantilever with a projecting tip near its distal end and at least one second protuberance in proximity. The protuberance may be so engineered that it hits the inkwell surface when the tip is sucked in a microwell during inking and thus acts as a spacer between the cantilever beam and inkwell surface, limiting wicking. For example, the protuberance could be pyramidal or conical or knife-edge-like, similar in appearance to the tip but shorter in length.

In a second embodiment, the invention provides Dip Pen Nanolithography probes with high-aspect-ratio, tall tips, which may again act as spacers between the cantilever beam and inkwell surface during inking. Tall, high-aspect-ratio tips also enable patterning at the bottom of deep, high-aspect-ratio trenches, for example, at the bottom of an etched quartz pit in an alternating aperture phase-shifting photomask (AAPSM), nanoimprint mold or any similarly ridged surface in microelectronics.

Traditional pyramidal tips produced by anisotropic etching of silicon have their aspect ratio (hence their height, given a reasonable cantilever width) limited by the natural angle between {111} planes. Thus anisotropic etching alone is not suitable for forming tall tips.

The standard mold formed by anisotropic etching of silicon is 4.5 um on a side and only 3.2 um deep.

High-aspect-ratio tips for Atomic Force Microscopy and related applications may be formed by depositing a film of a suitable material, such as silicon nitride, onto the wall of a high-aspect-ratio pit in a substrate, such as a silicon wafer. Such pit may be fabricated using Reactive Ion Etching (RIE), Bosch-process Deep Reactive ion Etching (DRIE), LIGA (German acronym for collimated X-ray lithography and electroplating), excimer laser ablation, Focused Ion Beam milling, or other similar techniques capable of forming high-aspect-ratio structures, separately or in combination with standard (wet) etch techniques.

The following provides an exemplary fabrication process for RIE-etch microcast high-aspect tips: After defining an opening in a suitable masking material, such as silicon dioxide or silicon nitride, a pit is formed by Reactive Ion Etch. This pit should have a steep, but substantially non-vertical sidewall. This pit will typically have a flat or rounded bottom with radius of curvature somewhat smaller than that of the original opening in the mask. This radius of curvature will generally be much too large for use in atomic force microscopy (AFM) or Dip Pen Nanolithography printing. After an optional short anistropic etch step, the sidewall of this pit may be subsequently oxidized, causing shrinkage in the volume of the pit, ultimately resulting in a sharp cusped profile. Under the right conditions, the bottom of this cusped cavity will have a radius of curvature of only a few nanometers, suitable for AFM imaging and high-resolution DPN printing.

A film of e.g. silicon nitride may be deposited on the substrate and oxidized sidewall of the pit. This material may be lithographically patterned to form a cantilever structure, integral with the tip being formed. The substrate may then be removed by etching, leaving a sharp, high aspect ratio molded tip.

Figure 12A:
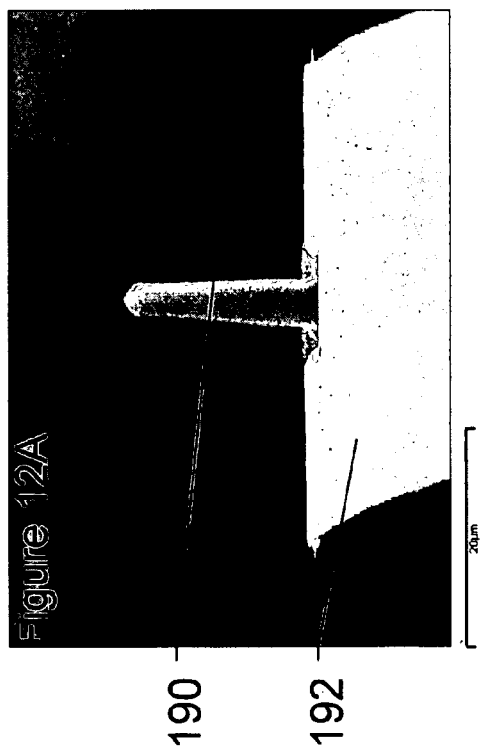
FIG. 12 contains three SEM images of high-aspect-ratio tips prepared by (a, b) reactive ion etching plus microcasting and (c) focused-ion-beam milling of a pyramidal tip.
Figure 12B:
Figure 12C:
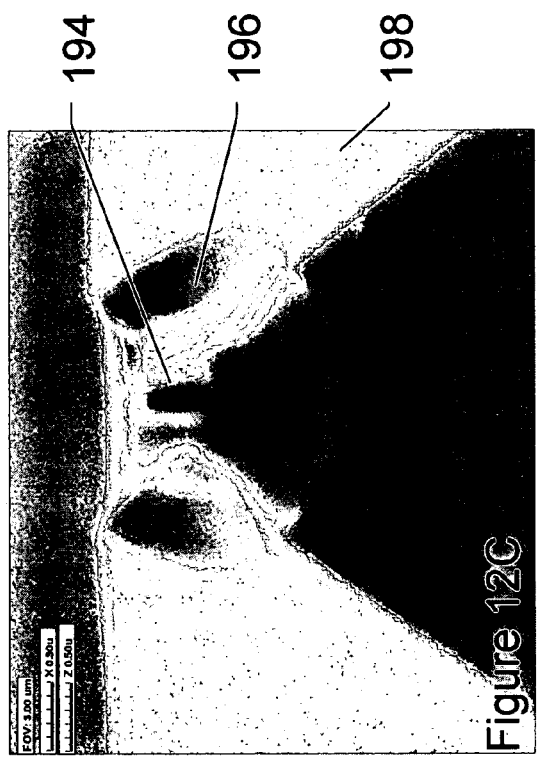

FIG. 12[A] is a scanning electron micrograph of a silicon nitride tip 190 prepared by this process. It is integrated with cantilever beam 192. FIG. 12[b] is an image at higher magnification of the apex of tip 190. Radiuses of curvature are typically below 145-150 nm.

Alternative methods to produce high-aspect-ratio tips include focused ion beam milling of low-aspect-ratio tips prepared by microelectronic fabrication techniques. Referring to FIG. 12[C], high-aspect-ratio protuberance 194 has been fabricated by milling of four notches 196 into the pyramidal tip 198 prepared according to Albrecht et al.

An example of thermally actuated probe arrays for parallel dip-pen nanolithography can be found in Wang et al, J. Vac. Sci. Technol. B, 22(6), November/December 2004, which is hereby incorporated by reference in its entirety including the figures and the experimental section, and description of sharp silicon actuated probes fabricated using SOI processes (silicon-on-insulator).

Embodiment 10

Inkwells for Active Pens

In another embodiment, the invention provides an improved system capable of selectively delivering multiple inks to multiple tips in a probe array, while minimizing cross-contamination due to e.g. fluid wicking in unwanted areas of the probes. One such system comprises a microfluidic circuit connected to shallow microwell(s), in which the very end of the probe tips (and only that part) is dipped.

Figure 13:
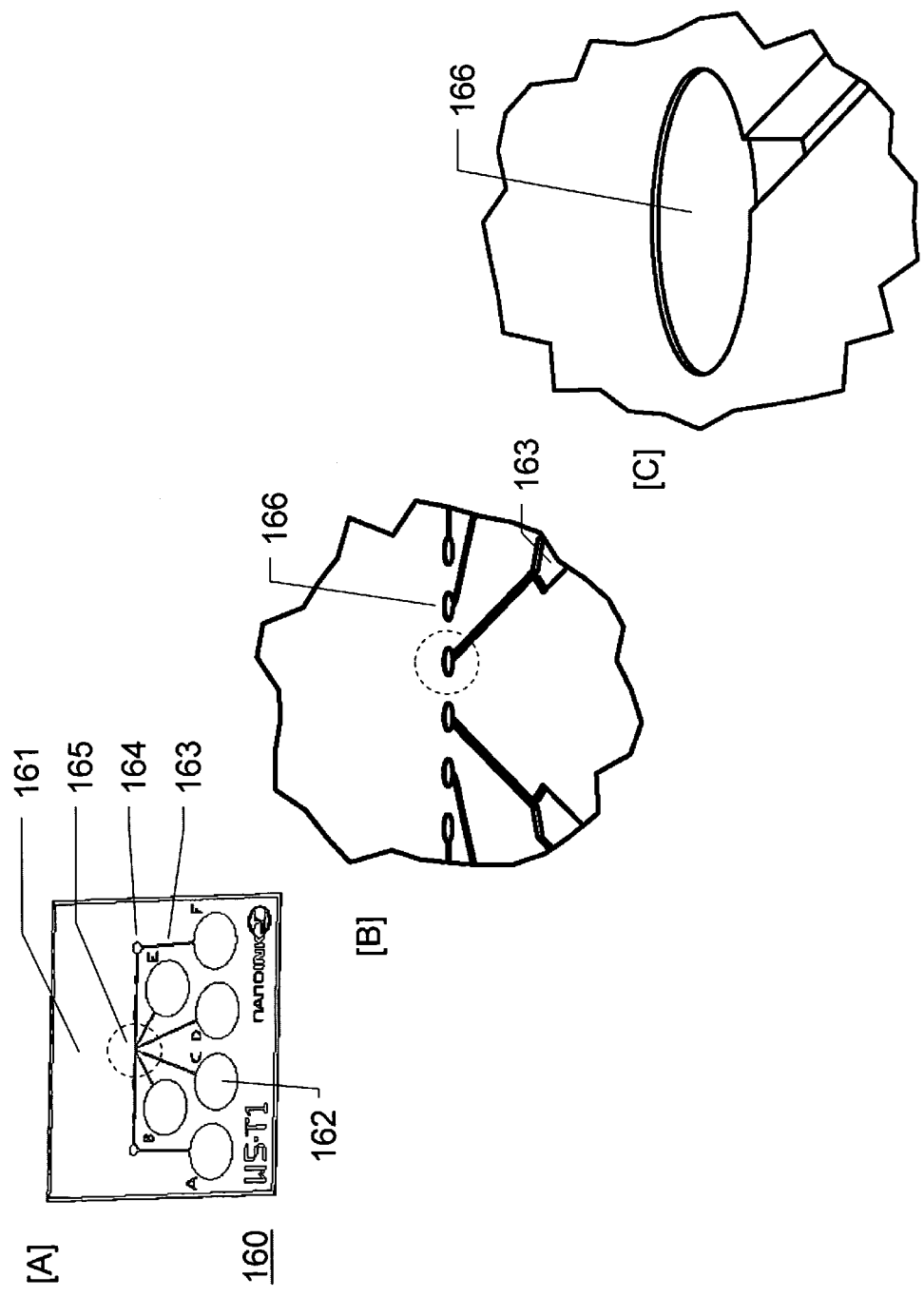
FIG. 13 is the schematic diagram of an "inkwell" microfluidic system for fluid delivery to actuated cantilevers, which incorporates anti-wicking shallow microwells.

Referring now to FIG. 13A, the microfluidic circuit 160, referred to as an "inkwell", comprises a work area 161, and at least one microfluidic circuit comprising of one or more microreservoir 162, microchannel 163, optional bubble trap 164, and shallow microwell array 165. Referring to FIG. 13B, the microwell array 165 comprises shallow microwells 166. Zooming further (FIG. 13C) reveals a depth difference between shallow microwells 166 and feeding channel 163.

Microreservoirs 162 are adapted to storing small fluid volumes delivered, for example, by a manual hand pipette. Microchannels forward this fluid by capillary action to microwells.

The pitch of these microwells preferably matches the spacing between tips in the probe array to ink, allowing the simultaneous distribution of multiple inks to the tips of a probe array. In this non-limiting example, up to 6 distinct inks may be simultaneously distributed to the microwells 165.

When a tip that is substantially perpendicular to the top surface of an inkwell and that projects from a cantilever beam substantially parallel to said surface is dipped into a microwell, strong capillary forces induced by the fluid meniscus drive said tip into the microwell. If the microwell is deeper than the tip is long, the cantilever beam near the base of the tip contacts the top surface of the inkwell that surrounds the microwell. The fluid contained in the microwell then tends to wick between the cantilever beam and said inkwell surface. This effect tends to become more pronounced as the force constant of the cantilever decreases. Such wicking deposits ink in unwanted areas, for example the area of the cantilever used to reflect a laser beam. If ink is spilled in close proximity to the heater or bimorph element of a thermomechanically actuated cantilever, volatile compounds in the ink tend to evaporate then condensate on cold surfaces in close proximity, again inducing contamination. Wicking may also mix inks on neighboring cantilevers.

Therefore, in a preferred embodiment, the depth of the microwells is preferably inferior to the length of the tips that dip in them, while the depth of the reservoir and microchannel is kept as large as possible to minimize evaporation and reduce clogging. The reservoirs and channels 162-164 may be 10 µm or more in depth and especially 100 µm or more in depth, while the microwells may be 1 µm or less in depth, or 2 µm or less in depth, or 5 µm or less in depth.

The top surface of the inkwell is preferably coated with a low-energy film, in order to prevent fluid escape from the open microchannels and thus limit wicking, while the reservoirs and channels have preferably a high surface energy to favor their wetting.

Figure 14:
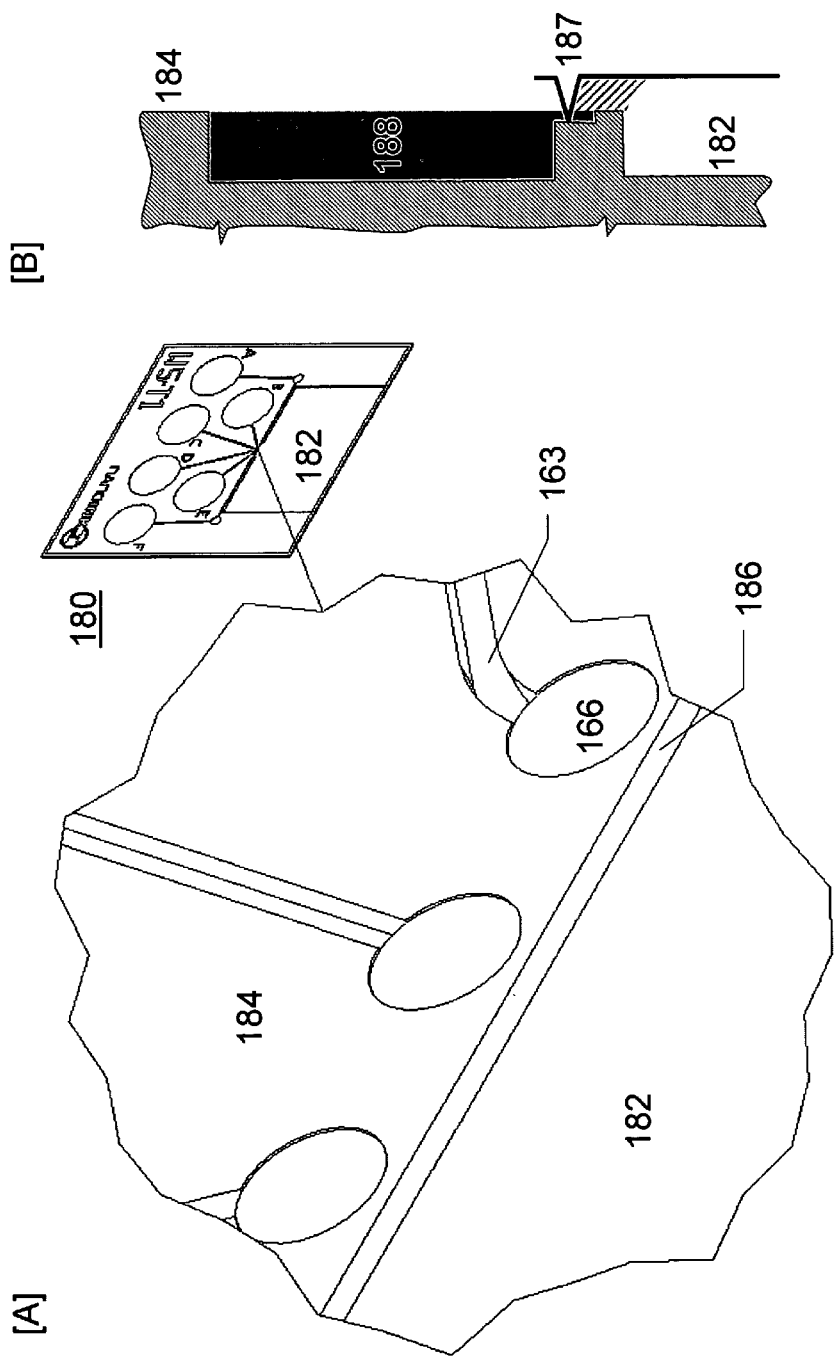
FIG. 14 is a schematic diagram of an inkwell comprising an anti-wicking vertical edge.

The inkwell may also comprise a vertical edge in close proximity to the microwells. Referring to FIG. 14, the inkwell 180 comprises, in addition to the aforementioned reservoirs, microchannels and (shallow) microwells 162 to 166, a recessed area 182 separated from the inkwell top surface 184 by a substantially vertical facet 186 placed in proximity to microwells 166. The schematic cross-section in FIG. 14B illustrates containment by vertical facet 186 of any fluid that may have wicked when a tip 187 is plunged into the fluid 188 contained into channel 163 and microwell 166. Preferentially, the microchannels 163 and the recessed area 182 may be etched in the same fabrication step to similar depths. In a more advanced design, the recessed area 182 may cover all areas of the chip but a narrow rim around the microfluidic circuit; the inkwell would then resemble a miniature dam or dike, in which thin walls confine the ink fluid(s).

The invention also provides an improvement to the method of fabricating inkwell disclosed for example in PCT publication WO 2004/044552 to Cruchon-Dupeyrat et al. Inkwells 160 and 180 may be fabricated with a simple two-photomask process utilizing deep reactive ion etching of the silicon substrate at two different depths. The following provides a typical sequence of process steps:

A cleaned <100> silicon wafer, typically 400 microns in thickness, is oxidized e.g. by exposure to steam at 1100° C. until formation of approximately 2 um of silicon dioxide.

The oxide is then patterned with an array of small disks corresponding to the shallow microwells: After a dehydration bake and vapor prime with hexamethyldisilazane, the oxidized silicon substrate is spin-coated with a photoresist (e.g. S1813 from Shipley Corp.). The resist layer is soft baked in an oven at 90° C., exposed to UV radiation through a photomask, developed then hard baked. The unprotected oxide is then wet or dry etched. Preferably, reactive ion etching (RIE) with a $CHF_3$ and $O_2$ mixture is performed long enough to clear the oxide. The remaining photoresist is then stripped.

The resulting structure comprising silicon substrate 170 and small silicon dioxide disks 171 is shown in FIG. 15(a).

A Teflon-like fluorocarbon polymer layer 172 is deposited on the silicon surface, e.g. using a 15 mTorr $C_4F_8$ plasma, within a "Bosch process" deep reactive ion etcher (DRIE) system from Surface Technology Systems (Newport, U.K.).

An etch mask is patterned in preparation for the patterning of the reservoirs and channels. Two layers of S1813 photoresist layer are spun on top of the fluorocarbon polymer for a total thickness ~24,000 Å, soft baked and exposed to UV through a second photomask aligned with the first pattern 171, then developed and hard-baked.

Figure 15:
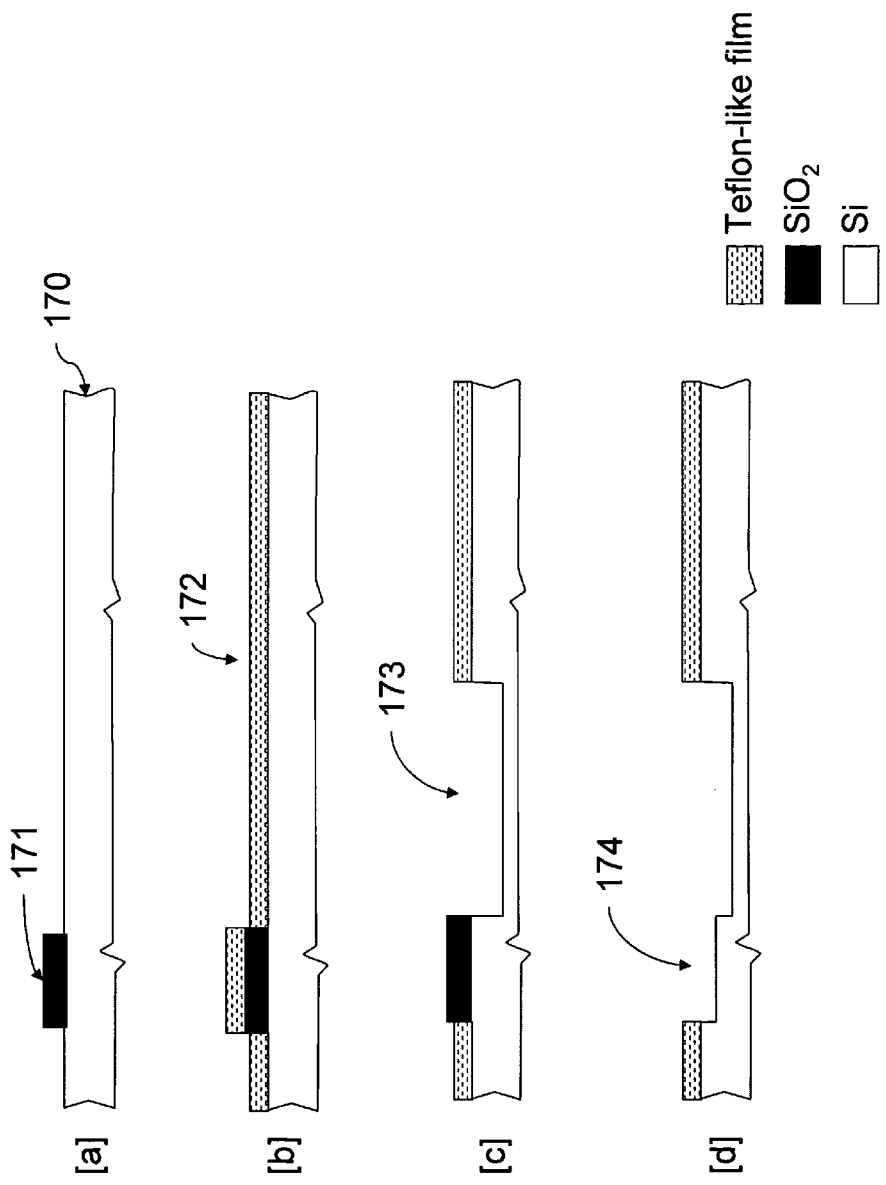
FIG. 15 illustrates a process sequence for fabricated inkwell with shallow microwells.

The Teflon-like film is removed in resist-free areas, for example with a RIE oxygen plasma, exposing silicon, which may then be etched to a depth of approximately 100 microns, for example, with DRIE using alternatively $SF_6$ and $C_4F_8$ gases. The resulting deep trench 173 forms the microchannels and ink reservoirs 162 to 164. The silicon substrate underneath the silicon dioxide mask 171 remains protected. The silicon dioxide mask 171 is then removed by wet etching (using buffered oxide etch). A second silicon etch step (e.g. using RIE to a depth of approx. 1 micron) forms shallow recess 174. FIG. 15 is not to scale.

In a final step, the wafer is protected with two layers of unbaked photoresist, diced, and the remaining photoresist is stripped. The surface of the microwells, channels and reservoirs is rendered hydrophilic, for example by immersing the inkwell in a mixture of sulfuric acid and hydrogen peroxide.

Silicon handle chip can be etched in KOH or TMAH if desired rather than diced.

A person skilled in the art will recognize that numerous alternative embodiments and applications of the present invention exist. These alternatives are considered to be within the scope of the present invention. In particular, this includes the use of said actuated probes for (i) other forms of nano-lithography than DPN, including scanning probe nanolithographies; (ii) the fabrication or repair of the masks used in semiconductor chip manufacturing, including the photomasks used in deep UV photolithography; (iii) the repair of flat panel displays; (iv) the fabrication or repair of micro- or nanostructured stamps or molds; and (v) electronic testing, including uses of actuated cantilevers in a wafer probe card, are considered within the scope of the present invention.

Further included are the uses of the fabrication methods outlined above for the fabrication of other type of microactuators, including membrane-type actuators.

All cited references, including these in the introductory and exemplary sections, are hereby incorporated by reference in their entirety. No admission is made that any of the cited references is prior art.

The following embodiments were described in priority provisional application Ser. No. 60/625,585 filed Nov. 8, 2004 to Fragala et al., which is incorporated by reference in its entirety including the claims and figures:

1. An actuated cantilever chip for direct-write nanolithographic printing with a delivery of a patterning compound from a tip to a surface comprising:
   a handle substrate comprising a top surface, a bottom surface, and side edges including a first side edge;
   at least one actuated cantilever array disposed on and extending from the handle substrate at a first side edge of the handle substrate;
   contact pads disposed on the handle substrate at a second edge of the handle substrate;
   conductive traces connecting the contact pads with the actuated cantilever array;
   wherein, optionally, the handle substrate comprises a sloping down region at the first side edge which provides optical access to the actuated cantilever array.

2. The chip according to 1, wherein the sloping down region comprises a set of ridges sawn into the substrate at increasing depths towards the first edge.

3. The chip according to 1, wherein the sloping down region is substantially smooth.

4. The chip according to 1, wherein the handle substrate comprises silicon, borosilicate glass, sapphire, or fused silica.

5. The chip according to 1, wherein the actuated cantilever array is connected to the handle substrate by a stub.

6. The chip according to 1, wherein the contact pads and the actuated cantilever array are disposed on the same surface of the handle substrate.

7. The chip according to 1, wherein the contact pads are disposed on the same surface as the actuated cantilever array but are disposed at the edge which is farthest from the first side edge.

8. The chip according to 1, wherein the contact pads are disposed on an opposite side of the handle substrate relative to the actuated cantilever array.

9. The chip according to 1, wherein the actuated cantilever array comprises both at least one reader pen and at least one writer pen.

10. A nanolithography instrument comprising the actuated cantilever chip for direct-write nanolithographic printing according to 1.

101. A thermomechanically actuated cantilever comprising a silicon nitride beam, a silicon nitride oxide-sharpened tip, a metallic thin-film resistive heater, and a bimorph element, wherein the beam is connected to a silicon handle.

105. An interconnection system for actuated probe chips using scanning probe microscopy or lithography, said system capable of reliably and reversibly electrically connecting at least one probe from said probe chip to at least one external electrical circuit.

201. A flexcircuit for use in direct-write nanolithographic printing comprising:
   (a) an actuated cantilever chip supported by a first stiffener,
   (b) a second stiffener comprising at least one high-density electrical connector, and
   (c) a flexible ribbon electrically connecting but mechanically decoupling the first and second stiffeners.

202. A direct-write nanolithographic printer comprising the flex circuit according to 201.

301. A direct-write nanolithographic printer comprising:
   (a) an actuated cantilever chip according to 1,
   (b) a flexcircuit according to 201,
   (c) a piezoelectric scanner capable of fine controlled motion along the X, Y, Z axis;
   (d) sample holder, and
   (e) a computer for controlling the actuated cantilever chip.

401. A software program for controlling direct-write nanolithographic printing with actuated probes comprising:
   (a) a client providing a user interface, and
   (b) a server which provide a non-interactive background and (i) communicates with and controls hardware, and (ii) provides execution of hardware command sequences sent by client.

402. The software program according to 401, wherein the client comprises an active pen control module, a pattern design module, a lithography engine, and a tip-to-tip alignment wizard.

403. The software program according to 401, wherein the server comprises an alignment layer module, an execution queue, a scanner, and active pen drivers.

404. The software program according to 402, wherein the tip-to-tip alignment wizard provides for the following steps:
   drawing at least one alignment mark for at least one actuated writer probe,
   reading at least one of the alignment marks with at least one reader probe,
   computing offsets between the reader probe tip and the writer probe tip,
   using computed offsets in subsequent imaging or writing.

501. A pattern fabricated with use of actuated cantilevers.

502. A pattern prepared by direct-write nanolithographic printing with an actuated probe.

503. The pattern of 502, wherein the actuated probe is a thermomechanically actuated cantilever.

601. A method for fabrication of probes for direct-write nanolithographic printing with a delivery of a patterning compound from a tip to a substrate comprising the steps of:
   anisotropically etching a patterned probe wafer to form a tip mold;
   oxidation sharpening of the tip mold;
   deposition patterning of silicon-rich silicon nitride by low pressure chemical vapor deposition to form cantilevers and tips;
   depositing and patterning of layers of metal to define heaters, heat spreaders, and wiring;
   thermocompressive bonding of said probe wafer to a handle wafer which comprises contact pads;
   release of the cantilevers.

602. The method of 601, wherein the thermocompression bonding is carried out with the handle wafer comprising a metal pattern.

701. A method for fabricating an actuated cantilever with use of anodic bonding comprising the step of anodically bonding a first and a second handle wafer.

801. A method for fabricating an actuated cantilever with use of low temperature wafer bonding comprising the step of bonding a first and a second handle wafer at a temperature of about 400° C. or less.

901. A method for fabricating an actuated cantilever with use of thermocompression wafer bonding comprising the step of thermocompression wafer bonding a first and a second handle wafer.

701. A method for fabricating actuated probes for scanning probe lithography comprising the steps of:
providing a probe wafer,
fabricating a probe member on said probe wafer,
providing a handle wafer,
bonding said probe wafer to handle wafer at a low temperature
removing parts or whole of said probe wafer, except said probe member 702. The method of 701, where the bonding temperature is inferior to 300 degrees Celsius 703. The method of 701, where the low-temperature wafer bonding method is chosen among the group consisting of adhesive wafer bonding, eutectic bonding, thermocompressive wafer bonding and low temperature frit glass wafer bonding.

704. The method of 701, wherein electrical interconnections and mechanical bonding of said probe members to said handle wafer are simultaneously realized.

801. A probe for scanning probe lithography comprising a tall high-aspect-ratio tip 802. The probe of 801, wherein said tip is used for direct-write nanolithographic printing with a delivery of a patterning compound from a tip to a substrate 803. An actuated probe for scanning probe microscopy and lithography comprising a tall, high aspect ratio tip 901. The method for fabricating a probe according to 801, said method comprising
Providing a substrate wafer
Fabricating a high-aspect-ratio pit in said substrate wafer
Casting a thin film on said substrate on top of said pit
Patterning said thin film
Bonding said substrate wafer to a handle wafer
Dissolving said substrate wafer 902. The method of 901, where the method for fabricating a high aspect ratio tip is chosen among a group consisting of focused ion beam milling, excimer laser machining, and deep reactive ion etching 1001. A microfluidic circuit adapted to delivering at least one chemical compound or mixture to at least one tip of at least one probe for direct-write nanolithographic printing, said circuit comprising at least one fluid reservoir, at least one shallow microwell, at least one microchannel connecting said reservoir to said microwell, 1002. The microfluidic circuit of 1001, where the depth of said microwell is inferior to the length of said tip 1101. A method of fabrication for an inkwell according to 1001, said method comprising
Providing a silicon wafer
Optionally depositing a low-surface-energy coating on said wafer
Selectively etching areas of said wafer with a high aspect ratio to a depth pf 10 um or more
Selectively etching areas of said wafer with a low aspect ratio, to a depth inferior to 5 um 1102. The method of 1101, further comprising
Preparing and patterning a dielectric mask layer on said silicon wafer
Using said dielectric mask to protect said wafer surface during said first selective etching
Removing said dielectric mask
Etch to said second depth.

Additional Design Embodiments for Inkwells

Figure 16:
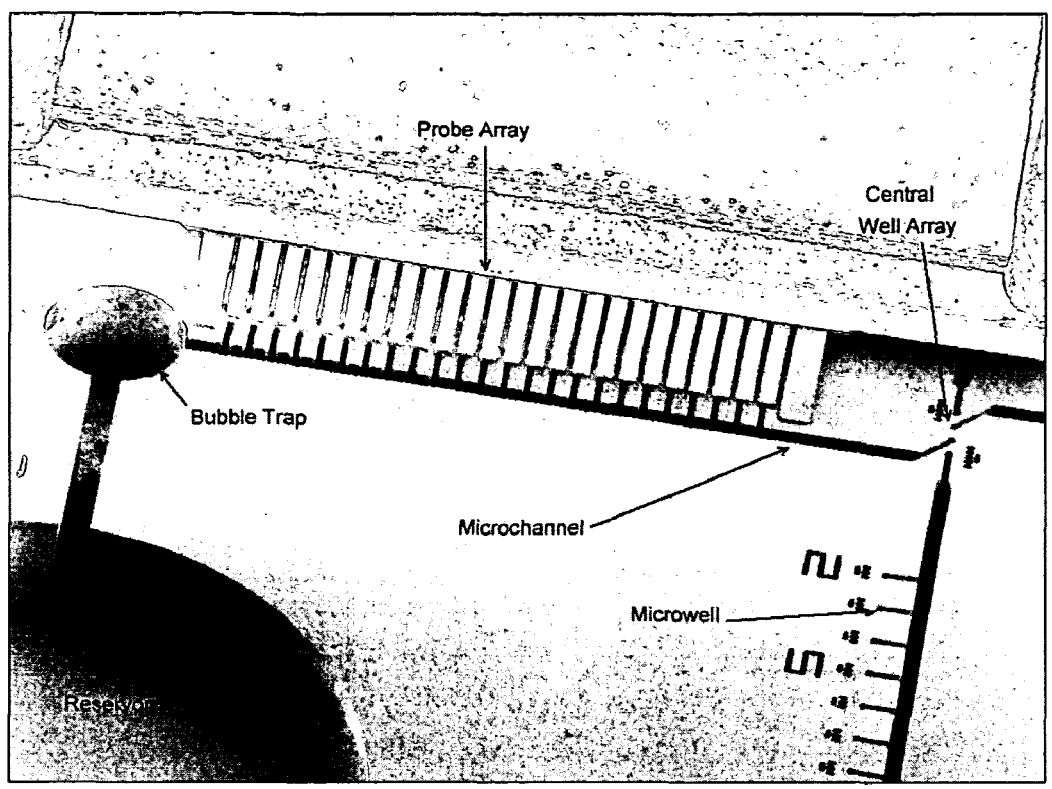
FIG. 16 illustrates an SEM image of a first generation microwell array morphology.

FIG. 16 shows a first generation microwell array morphology.

The additional designs summarize some of the basic physical, dimensional and performance specifications for inkwells. DPN™ probe arrays were dipped into micron-sized cavities (or "microwells") containing different inks for coating the probe array tips. A series of microwell arrays was designed to meet the assorted needs of inking probes for DPN pens. Some arrays were pitch-matched to passive probe arrays, while others accommodated the subtleties of dipping Active Pens. The microfluidic Inkwell delivered different inks to different microwells, allowing the probe arrays to be coated with the same or different inks depending on the array and Inkwell chosen.

The Inkwell die were between 8 and 10 mm square, easily fitting onto the nanolithographic instrument, NSCRIPTOR™, sample puck. Inkwells had 6 reservoirs, corresponding to the 6 writer pens on the Active Pen array. These 6 reservoirs enabled the inking of 6 adjacent active writer pens with 6 different inks. The reservoirs were filled with ink using a micropipette. The reservoirs supplied inks to the microwells by capillary wicking in micron-sized conduits, or "microchannels." The microchannels ran from individual reservoirs (at the periphery of the die) to the center of the die, where they feed the microwells. The system was designed to keep the microwells full of ink, even as the ink supply slowly evaporated in some cases from the reservoir.

Active Pen Inkwells are designed specifically for use with Active Pens, and the basic design is shown in FIG. 17. They include several changes from the older passive pen Inkwell designs, notably: (i) InkCliffs to prevent wicking; and (ii) optimized surface coatings to contain ink flow.

Table 1 lists design element specifications of the Active Pen Inkwell arrays. FIG. 17a shows the overall layout of the Active Pen Inkwell chip, with FIG. 17b providing more detail. FIG. 17a shows a central microwell array, with satellite microwells available along the "A" and "F" microchannels. The central microwell array (FIG. 17b) was pitch-matched to either the T1, T2, or T3 active pen arrays. A recessed "InkCliff" region extends along all of the microwells; this region was etched 150 μm below the surface of the Inkwell.

FIG. 18 illustrates how the InkCliff aids ink dipping—it provides a barrier to prevent ink from wicking along the underside of the cantilever. By keeping the microwell close to the edge of the InkCliff, wicking is limited to the area immediately surrounding the tip (shown in FIG. 19). Finally, enhanced hydrophobic surface coatings inhibit ink from spilling out of the reservoir, microchannel, and microwell, while hydrophilic channel coatings work to keep the ink contained. (Note: these inkwells are compatible with hydrophilic inks.)

Universal Inkwells

The Universal Inkwells represent a novel inkwell development, and they can replace all previous inkwell types. The design accommodates active pens, plus E and F-type passive pens, all on one chip. The chip has separate active pen and passive pen dipping areas. These Inkwells incorporate the design changes noted above, and introduce several improvements:

Active Pen Area of Universal Inkwells
Compared to previous designs, these microwells now protrude from the surrounding chip, providing an "inking peninsula" of sorts to isolate the ink dipping event and prevent wicking or contamination.

The microwell pitch has been increased to 400 μm, which actually proves ideal for active pen dipping. In this process, there is no need to dip adjacent active writer pens simultaneously. In fact, this is discouraged as it increases the chance of wicking and contamination.

Instead, each writer pen is dipped in succession, first inking pen #2 in an "A" microwell, and then translating across the chip to ink pen #3 in a "B" microwell. The 400 μm pitch between same-ink microwells ensures that other pens in the array will not be inadvertently inked.

The microwell-InkCliff distance has been decreased to 6 μm. This optimized distance reduces the overlap of the active writer pen heat spreader over the microwell, which reduces ink heating effects.

The recessed InkCliff area has been extended to the back edge of the chip. This larger region provides ample clearance for the probe chip during inking.

Passive Pen Area of Universal InkWells

The "A" and "F" active pen reservoirs also feed the passive pen section of the chip. To use the "A" passive pen section of the chip, rotate 90 degrees counter-clockwise. (Clockwise for "F.") These areas include the regular microwell arrays, and InkTroughs.

InkTroughs are a new feature provided to enable quick and easy inking of passive probe arrays with the same ink. Positioning the InkTrough near the edge of an InkCliff prevents ink from wicking to the underside of these arrays, while still ensuring that all pens are inked. The InkTrough is long enough to accommodate multiple adjacent probe chips for massively parallel DPN.

The passive microwell arrays contain 24 microwells spaced 35 μm apart. This array accommodates all of the E and F-type passive probe arrays. The 24 microwells exactly match the 24 writer pens of the A-26 array. (The D-type A-26 probe array is identical, and will work with these microwells too.) The A-3A and A-3C arrays have 70 μm pitch probes, and can be inked by lining up every other microwell. The A-18 probes also have 70 μm pitches: half of the array is dipped initially (lining up every other microwell), then the array is translated 840 μm (24 wells×35 μM pitch) and the remaining tips are inked. The A-52 probe array is intended for inking via the InkTrough only. Additionally, probe arrays type A-D can be inked passively using the InkTrough; this has proven more effective than using the 1$^{st}$ generation inkwells.

Figure 20:
FIG. 20 shows a preferred embodiment of an inkwell design.

FIG. 20 shows a photograph of a preferred embodiment.

TABLE 1

Nominal Dimensions DPN Active Pen and Universal Inkwells

| Inkwell Type | Active-Only T1 | Active-Only T2 | Active-Only T3 | Universal Inkwells Active Section | Universal Inkwells Passive Section |
|---|---|---|---|---|---|
| microwell pitches (μm) | 40 | 30 | 23 | 400 | 35 |
| microwell diameter (μm) | 20 | 20 | 15 | | 20 |
| microwell etch depth (μm) | 150 | 150 | 150 | | 85 |
| distance: edge of microwell to InkCliff (μm) | 10 | 10 | 10 | 6 | 6/ (InkTrough-to-InkCliff = 20) |
| InkCliff recess etch depth (μm) | 150 | 150 | 150 | | 85 |
| microchannel width (μm) | 40 | 40 | 40 | 40/ (6 near microwells) | InkTrough width = 40 |
| microchannel etch depth (μm) | 150 | 150 | 150 | | 85 |
| reservoir diameter (mm) | 1.5 | 1.5 | 1.5 | 2.0 | |
| substrate size (mm) | 7.8 × 7.8 | 7.8 × 7.8 | 7.8 × 7.8 | 9.5 × 9.5 | |

What is claimed is:

1. A direct-write nanolithographic printer comprising:
a chip comprising a cantilever array which is adapted for individual electronic control of cantilever actuation;
a lithography apparatus which is adapted for electrically and mechanically controlling the chip for direct-write printing by delivery of ink from the cantilever array to a surface, the lithography apparatus comprising an intermediate circuit board and an instrument head; and
a cartridge which is adapted for electrically and mechanically coupling the chip to the lithography apparatus, wherein the cartridge is reversibly connectable to and removable from the lithography apparatus during normal use of the printer, and the cartridge comprises:
a first printed circuit board that supports the chip, the first printed circuit board being reversibly connectable to and removable from the instrument head;
a second printed circuit board comprising at least one high-density electrical connector, the second printed circuit board being reversibly connectable to and removable from the intermediate circuit board of the lithography apparatus via the high-density electrical connector; and
a flexible ribbon which provides electrical connectivity and mechanical decoupling between the first printed circuit board and the second printed circuit board.

2. The printer according to claim 1, wherein the cantilever array comprises tips at the ends of the cantilever for delivery of ink from the tip to the surface.

3. The printer according to claim 1, wherein the chip comprises electrical contact pads and traces for individual electronic control of cantilever actuation.

4. The printer according to claim 1, wherein the lithography apparatus provides computer control for electrically and mechanically controlling the chip.

5. The printer according to claim 1, wherein the lithographic apparatus further comprises a computer for the control of cantilever actuation.

6. The printer according to claim 1, wherein the lithographic apparatus further comprises computer hardware and software comprising (a) a client providing a user interface, and (b) a server which provides a non-interactive background and (i) communicates with and controls hardware, and (ii) provides execution of hardware command sequences sent by the client.

7. The printer according to claim 1, wherein the lithography apparatus provides an XYZ scanner for mechanically controlling the chip.

8. The printer according to claim 1, wherein the lithography apparatus provides a piezoelectric scanner for mechanically controlling the chip.

9. The printer according to claim 1, wherein the lithographic apparatus further comprises a sample holder.

10. The printer according to claim 1, wherein the lithographic apparatus further comprises a USB-to-I$^2$C bridge card.

11. The printer according to claim 1, wherein the cantilever array comprises tips at the ends of the cantilever for delivery of ink from the tips to the surface, the chip comprises electrical contact pads and traces for individual electronic control of cantilever actuation, and the lithography apparatus provides computer control for electrically and mechanically controlling the chip.

* * * * *